US012068644B2

(12) United States Patent
Corey, III et al.

(10) Patent No.: US 12,068,644 B2
(45) Date of Patent: Aug. 20, 2024

(54) HYBRID RADIAL-AXIAL MOTOR

(71) Applicant: DRS Naval Power Systems, Inc., Milwaukee, WI (US)

(72) Inventors: Calvin H. Corey, III, Scituate, MA (US); Edgar S. Thaxton, Groton, MA (US)

(73) Assignee: DRS NAVAL POWER SYSTEMS, INC., Milwaukee, WI (US)

( * ) Notice: Subject to any disclaimer, the term of this patent is extended or adjusted under 35 U.S.C. 154(b) by 0 days.

(21) Appl. No.: 17/495,262

(22) Filed: Oct. 6, 2021

(65) Prior Publication Data

US 2022/0109356 A1 Apr. 7, 2022

Related U.S. Application Data

(60) Provisional application No. 63/088,388, filed on Oct. 6, 2020.

(51) Int. Cl.
*H02K 16/04* (2006.01)
*H02K 1/27* (2022.01)
(Continued)

(52) U.S. Cl.
CPC .................................. *H02K 16/04* (2013.01)

(58) Field of Classification Search
CPC ............ H02K 16/04; H02K 1/27; H02K 7/09; H02K 21/12
(Continued)

(56) References Cited

U.S. PATENT DOCUMENTS 7,034,422 B2 4/2006 Ramu
9,419,504 B2 8/2016 Finkle
(Continued)

FOREIGN PATENT DOCUMENTS

CN 104875594 A * 9/2015
CN 106515406 A * 3/2017 ............... B60K 1/00
(Continued)

OTHER PUBLICATIONS

Application No. PCT/US2021/053735, International Search Report and Written Opinion, Mailed on Jan. 12, 2022, 13 pages.
(Continued)

*Primary Examiner* — Jose A Gonzalez Quinones
(74) *Attorney, Agent, or Firm* — Kilpatrick Townsend & Stockton LLP

(57) ABSTRACT

An electric machine may include a housing that encloses both a radial motor producing radial flux in a first direction, the radial flux influences a first magnetic unit to produce a first torque on a rotor arm attached to a shaft. The housing can also include an axial motor producing axial flux in a second direction to influence a second magnetic unit to produce a second torque on the rotor arm attached to the shaft, wherein the radial motor and the axial motor are positioned in the housing to reduce cross magnetic flux from either the radial motor or the axial motor. The primary radial motor can include either a permanent magnetic motor or an induction motor. The secondary radial motor can include one of a permanent magnet motor, an induction motor, or a transverse flux motor. The current and phase of primary and secondary motors can be independently controllable.

18 Claims, 24 Drawing Sheets

(51) Int. Cl.
  *H02K 7/09* (2006.01)
  *H02K 21/12* (2006.01)
(58) Field of Classification Search
  USPC ..... 310/112, 114, 156.36, 166, 75 R, 83, 98, 310/154.33
  See application file for complete search history.

(56) References Cited

U.S. PATENT DOCUMENTS

| | | | |
|---|---|---|---|
| 2005/0151437 A1* | 7/2005 | Ramu | H02K 19/103 310/268 |
| 2009/0001831 A1 | 1/2009 | Cho et al. | |
| 2011/0148237 A1* | 6/2011 | Toot | H02K 16/02 310/114 |
| 2018/0138766 A1 | 5/2018 | Moore et al. | |
| 2018/0323665 A1* | 11/2018 | Chen | H02P 21/00 |

FOREIGN PATENT DOCUMENTS

| | | | | |
|---|---|---|---|---|
| JP | 2000297850 A | * | 10/2000 | |
| WO | WO-9718101 A1 | * | 5/1997 | ............... B60K 6/22 |

OTHER PUBLICATIONS

Tsai, "Research of Axial-Radial Flux Permanent Magnet Integrated Starter/Generator Based on Dual Air-Gap Design", 21st International Conference on Electrical Machines and Systems (ICEMS), Oct. 7-10, 2018, pp. 261-264.

Wang et al., "Investigation of a Novel Hybrid Radial and Axial Magnetic Circuit Permanent Magnet Motor with Flux Weakening Capability for EVs", 20th International Conference on Electrical Machines and Systems (ICEMS), Aug. 11-14, 2017, pp. 1-6.

* cited by examiner

HYBRID RADIAL-AXIAL MOTOR

CROSS-REFERENCES TO RELATED APPLICATIONS

This application claims the benefit to U.S. Provisional Application No. 63/088,388, filed Oct. 6, 2020 entitled "A Hybrid Radial-Axial Motor," the disclosures which is incorporated by reference in its entirety and for all purposes.

BACKGROUND

Integrated Electric Propulsion is becoming an attractive solution for commercial and naval vessels. Integrated Electric Propulsion systems decouple ship propulsion from gas turbine and diesel engines, increase plant layout flexibility as well as fuel economy relative to more conventional mechanical drive solutions. In addition, Integrated Electric Propulsion systems offer significant reductions in sound signatures associated with large reduction gearboxes. Typically, Integrated Electric Propulsion plants are sized to accommodate peak loads at rated speeds. Using a single shaft allows the electrical power machine to run at high speed, achieving a high power density. However, low speed, low power modes can exist (e.g., a patrol or cruise mode) in which the larger propulsion plant is less efficient.

Despite the progress made in the area of Integrated Electric Propulsion, there is a need in the art for improved methods and systems related to electric systems.

SUMMARY

This application relates generally to the field of electric motors, and, more particularly, to hybrid Radial-Axial flux motors. In some embodiments, the rotors include a magnetic element for a radial flux motor and a magnetic element for an axial flux motor. The radial flux motor and the axial flux motor are operated independently to provide benefits not available using conventional techniques. Embodiments of the present invention are applicable to a variety of systems including electric motors, including ship-based, vehicle-based, and aviation systems.

In various aspects an electric machine includes a housing; a radial motor located inside the housing, the radial motor configured to produce radial flux in a first direction, the radial flux influences a first magnetic unit to produce a first torque on a rotor arm attached to a shaft; an axial motor located inside the housing, the radial motor configured to produce axial flux in a second direction, the axial flux influence a second magnetic unit to produce a second torque on the rotor arm attached to the shaft; and a controller or load configured to independently control the first torque and the second torque.

In various embodiments, the controller controls d-axis current and q-axis current applied to at least one of the radial motor, the axial motor, or a combination thereof to reduce torque oscillation on the shaft.

In various embodiments, the radial motor or the axial motor is replaced with a gear set.

In various embodiments, the radial motor comprises an induction motor.

In various embodiments, the radial motor comprise of a wound-field synchronous motor.

In various embodiments, 6. The electric machine of claim 1, wherein the radial motor comprises of a DC motor In various embodiments, the radial motor comprises of a universal motor.

In various embodiments, the radial motor comprises of a reluctance motor.

In various embodiments, two or more axial motors within the housing.

In various embodiments, the axial motor comprises an induction motor.

In various embodiments, the electric machine includes a transverse-flux motor within the housing, the transverse-flux motor produces transverse flux in a third direction, the transverse flux influences a third magnetic unit to generate a third torque on the rotor arm attached to the shaft.

In an aspect of the disclosure, a propulsion system, includes a housing; a radial motor located in the housing, the radial motor configured to produce radial flux in a first direction, the radial flux influences a first magnetic unit to produce a first torque on a rotor arm attached to a shaft; an axial motor located in the housing, the radial motor configured to produce axial flux in a second direction, the axial flux influence a second magnetic unit to produce a second torque on the rotor arm attached to the shaft; and a controller configured to independently control the first torque and the second torque.

In various embodiments, the controller controls d-axis current and q-axis current applied to at least one of the radial motor, the axial motor, or a combination thereof to reduce or amplify torque oscillation on the shaft.

In various embodiments, the radial motor or the axial motor is replaced with a gear set.

In various embodiments, the radial motor comprises an induction motor.

In various embodiments, the axial motor comprises an induction motor.

In various embodiments, the propulsion system includes two or more axial motors within the housing.

In various embodiment, the propulsion system includes a transverse-flux motor within the housing, the transverse-flux motor produces transverse flux in a third direction, the transverse flux influences a third magnetic unit to generate a third torque on the rotor arm attached to the shaft.

In an aspect of the disclosure, a method of producing torque on a shaft for a propulsion system includes receiving a first current at a radial motor having a rotor arm attached to the shaft, wherein the radial motor is positioned in a housing. The method can include producing radial flux in a first direction in response to the first current. The method can include generating a first torque on the rotor arm based on the radial flux interacting with a first magnetic unit. The method can include receiving a second current at an axial motor, wherein the axial motor is positioned in the housing. The method can include producing axial flux in a second direction. The method can include generating a second torque on the rotor arm based on the axial flux interacting with a second magnetic unit.

In various embodiments, the first current comprises a first set of d-axis and q-axis currents applied to the radial motor.

In various embodiments, the second current comprises a second set of d-axis and q-axis currents applied to the axial motor.

In various embodiments, the first torque is characterized by a first oscillation amplitude; the second torque is characterized by a second oscillation amplitude; and a sum of the first torque and the second torque is characterized by an integrated oscillation amplitude less than both the first oscillation amplitude and the second oscillation amplitude.

In various embodiments, the method includes operating the propulsion system in a boost mode by: setting the first current at a first maximum value; and setting the second current at a second maximum value.

In various embodiments, the method includes operating the propulsion system in a coast mode by selectively reduce or de-energize the first or the second current, or a combination thereof.

Numerous benefits are achieved by way of the present invention over conventional techniques. For example, embodiments of the present invention can provide improved efficiency (especially at low power requirements), greater flexibility, and improved control of torque fluctuations of the propulsion system.

A Radial-Axial flux (RADAX) hybrid motor configuration combats reductions in system efficiency through the integration of one or more magnetically and electrically isolated Axial Flux Permanent Magnet (AFPM) machines into an Integrated Electric Propulsion Motor. This allows the primary windings to de-energize during off-peak load conditions (e.g., patrol, low speed transit, coast) while secondary windings carry the propulsion load. A RADAX configuration offers improvements in volume density as the AFPM motors are located within the primary propulsion motor, occupying otherwise unused space. The RADAX configuration disclosed herein forms a hybrid permanent magnet solution creating a new hybrid induction-permanent magnet motor. The disclosed RADAX configuration offers secondary benefits, such as fault tolerance and the ability to counteract axial thrust in the propulsion shaft and propulsions derived ship service power.

The RADAX concept can be applied onto two of the most prevalent propulsion motor types, the Radial Flux Induction Motor (RFIM) and Radial Flux Permanent Magnet (RFPM) propulsion motor.

The RADAX concept permits integration of multiple electromagnetic topologies into a single propulsion system, allowing the designer to mix and match the best topologies for each load scenario. The result is a compact, highly efficient propulsion system which increases capability as well as propulsion system fault tolerance.

These and other embodiments of the disclosure, along with many of its advantages and features, are described in more detail in conjunction with the text below and corresponding figures.

BRIEF DESCRIPTION OF THE DRAWINGS

Like reference, symbols in the various drawings indicate like elements, in accordance with certain example implementations. In addition, multiple instances of an element may be indicated by following a first number for the element with a letter or a hyphen and a second number.

DETAILED DESCRIPTION OF THE DRAWINGS

The following detailed description of example implementations refers to the accompanying drawings. The same reference numbers in different drawings may identify the same or similar elements.

The disclosed Radial-Axial flux (RADAX) hybrid motor configuration combats reductions in system efficiency through the integration of one or more magnetically and electrically isolated Axial Flux Permanent Magnet (AFPM)

machines into the hybrid electric motor, allowing the primary windings to de-energize during off peak load conditions (e.g., patrol speed, low speed transit, etc.) while secondary windings carry the propulsion load. A RADAX configuration offers improvements in volume density as the AFPM motors are located within the primary propulsion motor, occupying otherwise unused space. The disclosed RADAX configurations also offer secondary benefits, such as fault tolerance and the ability to counteract axial thrust in the propulsion shaft and propulsion derived vehicle/vessel/aircraft service power.

As used herein, a radial motor produces radial flux that flows along a radius of the machine's axial shaft and perpendicular to the machine's axial direction. An axial flux motor produced axial flux that flows in the axial direction of the machine.

Conventional electric motors and generators are limited to a single operation mode in which the motor is solely providing torque and rotational movement to the load which is coupled to the motor shaft. Several operational modes can be used for a RADAX configuration in which both the primary and secondary motors, the primary or the secondary motors or some combination of primary and secondary motors drive the common shaft.

Figure 1:
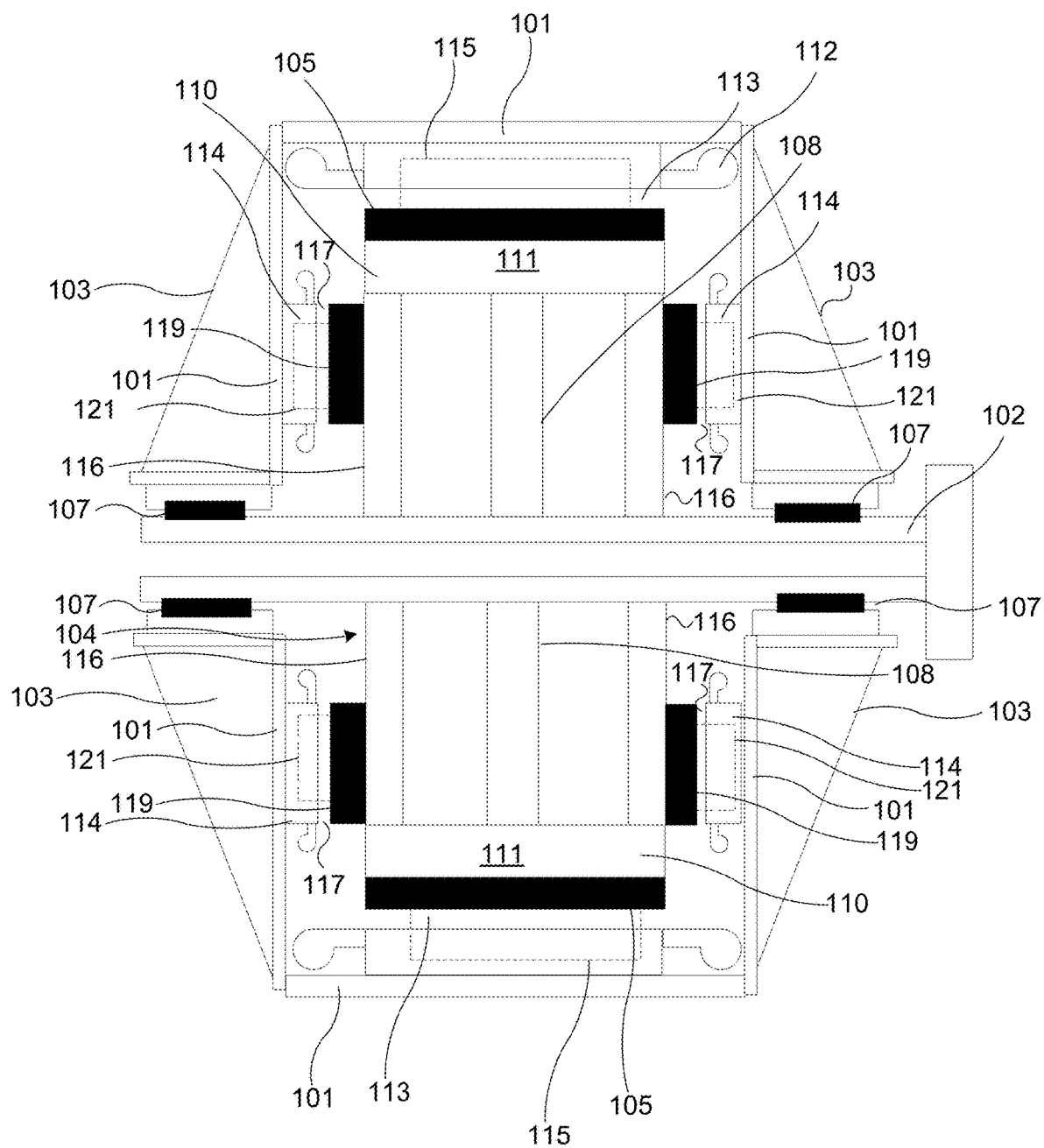
FIG. 1 illustrates an exemplary cross cutaway perspective view of a Radial-Axial Permanent Magnet Propulsion Motor according to an embodiment of the present invention.

FIG. 1 illustrates an exemplary cross cutaway perspective view of a Radial-Axial permanent magnet propulsion motor according to an embodiment of the present invention. In an exemplary configuration, the primary motor can include a radial flux permanent magnet and the secondary motors can include two axial flux permanent magnet motors.

In a radial flux motor the magnetic field, or flux, runs radially with respect to the direction of the rotor shaft. In FIG. 1, the rotor shaft is the common rotor shaft 102.

An axial flux motor is a geometry of motor construction with gap between the rotor and stator, and therefore the direction of magnetic flux between the two, is aligned parallel with the axis of rotation, rather than radially as with the radial flux motor.

Axial Flux motors can deliver significantly higher power density for several reasons. First, for Axial Flux machines, the torque-producing magnets transverse radially along the rotor disk. This causes the radial portion of the rotor structure to produce electromagnetic torque, eliminating the need for a concentric rotor hoop, minimizing weight and volume of the motor assembly. Second, in case of radial flux machines, much of the windings (as much as 50%) are not active (the part located at the exterior of the stator teeth which is only used to make loops (so-called "coil overhang"). The coil overhang is geometrically consistent on both extents of the motor, and results in additional electrical resistance (e.g., heat dissipation) while not contributing to torque production. Conversely, Axial Flux stator end turns are not geometrically consistent, due to the motors native "donut shape". In Axial Flux machines, the inside diameter end-turns transvers a smaller tangential distance than the outside diameter end-turns, minimizing end turn resistance and consequent heat load. The result is that Radial Flux motors have an overall lower power/weight ratio, when compared with axial flux machines.

The Radial-Axial motor shown in FIG. 1 combines the advantages of both radial and axial motors and results in a more efficient, more power dense machine. In addition, each of the radial and axial motors can be independently controlled to fine tune motor performance and reduce any unwanted torque fluctuations for the common shaft 102. By reducing torque fluctuations on the common shaft, vibrations can also be controlled (increased or reduced). Vibrations on equipment wear out the equipment, and increase the detectability and identification of the vessel through its sound signature. Therefore, one of the advantages of the Radial-Axial motor is to allow for more efficient operations particularly at low speed and reduce undesirable power fluctuations in the shaft.

FIG. 1 illustrates a RADAX motor end wall 101 and a motor frame 103. Inside the motor frame 103, one or more rotor assemblies can be attached to a common motor shaft 102. The primary rotor assembly 104 can include a round disc 108 having an inner portion near the center of the round disc 108 and an outer portion 110 along the circumference of the round disc 108. The outer portion 110 of the rotor assembly 104 can be T-shaped and can include a rotor assembly surface 111. The primary rotor assembly can be attached at inner portion 106 to the common motor shaft 102. A permanent magnet 105 can be affixed onto the outer portion 110 on the rotor assembly surface 111 of the T-shaped end of the rotor assembly 104. In some embodiments, an induction rotor including a number of rotor windings be used for the primary rotor instead of the permanent magnet 105. A primary motor stator 112 can be attached to the inside surface of the circular RADAX motor end wall 101. The primary motor stator 112 can be installed such there is an air gap 113 between the primary rotor assembly 104 and the primary motor stator 112. A first electric current can pass through the primary stator assembly 112 to generate a magnetic field 115. The magnetic field 115 generated by the primary stator assembly 112 can influence the permanent magnetic 105 affixed to the surface 111 of the primary motor rotor 104 causing a radial force to turn the common motor shaft 102. Bearings 107 can be installed around the common motor shaft 102.

The RADAX motor frame 103 can include RADAX motor end walls 101. A secondary motor stator 114 can be affixed along the inner portion of each of the RADAX motor end walls 101. The secondary motor stator assembly 114 can include a circular stator assembly encircling the common motor shaft 102. A second electrical current can be applied to the circular stator assembly 114 to generate a magnetic field 121. A secondary rotor assembly 116 can be affixed to the common motor shaft 102 such that there is an air gap 117 between the outside surface of the secondary rotor assembly 116 and the inner surface of the secondary motor stator assembly 114. One or more permanent magnets 119 can be affixed to the outer surface of the secondary rotor assembly 116 such that the permanent magnets 119 are influenced by the magnetic field 121 generated by the secondary motor stator assembly 114. The secondary rotor assembly 116 can be mounted inside the secondary motor stator assembly 114 on the common motor shaft 102. The magnetic field 121 generated by the secondary motor stator assembly 114 can influence the magnetic field generated by the permanent magnet 119 on the secondary rotor assembly 116 causing an tangential force to turn the common motor shaft 102.

The first electrical current can be separate and independent from the second independent current. In some embodiments, additional independent electrical currents can be applied (e.g., a third current, a fourth current, a fifth current, etc.) Each of the independent electrical currents (e.g., a first current, a second current, etc.) can be independently controlled. For example, the amperage, voltage, and d-axis and q-axis inductances can be independently controlled and adjusted.

The d-axis and q-axis inductances are the inductances measured as the flux path passes through the rotor in relation to the magnetic pole. The d-axis inductance is the inductance measured when flux passes through the magnetic poles. The q-axis inductance is the inductance measure when flux passes between the magnetic poles.

In an induction machine, the rotor flux linkage will be the same between the d-axis and the q-axis. However, in a permanent magnet machine, the magnet reduces the available iron for flux linkage. A magnet's permeability is near that of air. Therefore, the magnet can be viewed as an air gap. The magnet is in the flux path as it travels through the d-axis. The flux path traveling through the q-axis does not cross a magnet. Therefore, more iron can be linked with the q-axis flux path, which results in a larger inductance. A motor with an imbedded magnet will have a larger q-axis inductance than the d-axis inductance. A motor with surface-mount magnets will have nearly identical q-axis and d-axis inductances because the magnets are outside the rotor and do not limit the amount of iron linked by the stator field.

Figure 2:
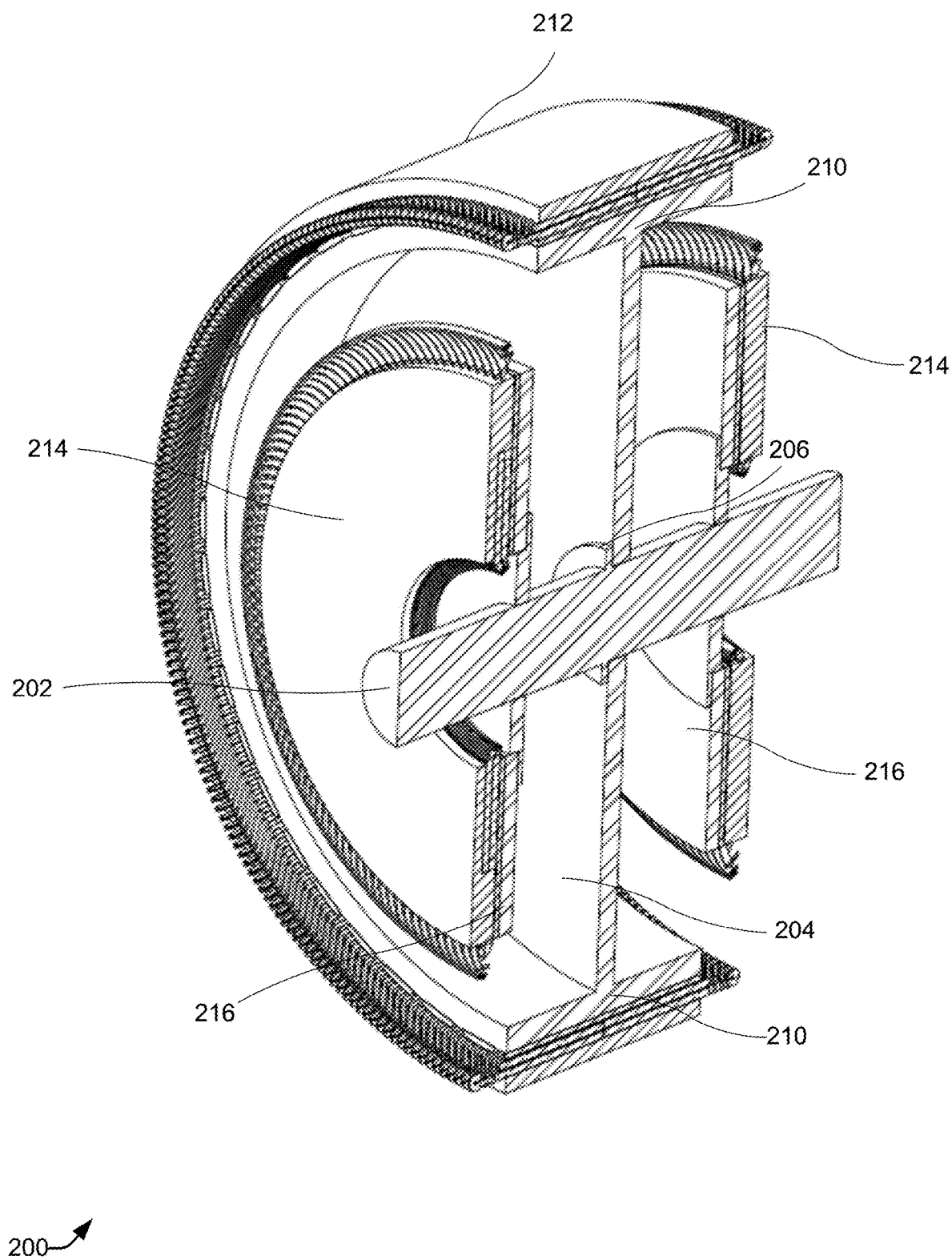
FIG. 2 illustrates an exemplary cutaway perspective view of a first configuration of a Radial-Axial propulsion motor according to an embodiment of the present invention.

Each of the primary motor and secondary motors can independently produce torque to rotate the common motor shaft 102 in the same direction about the axis of the common motor shaft 102. Reversing the respective field fluxes can cause each of the primary motor and the secondary motor to independently produce torque to rotate the common motor shaft 102 in the opposite direction. The radial motor and the axial motor can be positioned in the housing in such a way to reduce cross magnetic flux from either the radial motor or the axial motor FIG. 2 illustrates an exemplary cutaway perspective view of a first configuration of a Radial-Axial propulsion motor 200 according to an embodiment of the present invention. In a first configuration, the primary motor can include a radial flux permanent magnet motor. The secondary motors can include two axial flux permanent magnet motors. Although not shown in FIG. 2, the RADAX motor can include a motor end wall 101 and a motor frame 103, as shown in FIG. 1. Inside the motor frame 103, one or more rotor assemblies can be attached to a common motor shaft 202. The primary rotor assembly 204 can include a round disc having an inner portion 206 near the center of the round disc and an outer portion 210 along the circumference of the round disc. The outer portion 210 of the rotor assembly can be T-shaped and can include a rotor assembly surface. The primary rotor assembly 204 can be attached at inner portion 206 to the common motor shaft 202. One or more permanent magnets can be affixed onto the outer portion 210 of the primary rotor assembly surface of the T-shaped end of the primary rotor assembly 204. A primary stator assembly 212 can be attached to the inside surface of the circular RADAX motor frame 103, as shown in FIG. 1. The primary stator assembly 212 can be installed such that there is an air gap between the primary rotor assembly 204 and the primary motor stator 212. A first electric current can pass through the primary stator assembly 212 to generate a magnetic field. The magnetic field generated by the primary stator assembly 212 can influence the permanent magnetic affixed to the surface of the primary motor rotor 204 causing a radial force to turn the common motor shaft 202.

The RADAX motor frame can include two RADAX motor end walls. A secondary motor stator assembly 214 can be affixed along the inner portion of each of the RADAX motor end walls. The secondary motor stator assembly 214 can include a circular stator assembly encircling the common motor shaft 202. A second electric current can be applied to the circular stator assembly 214 to generate a magnetic field. A secondary rotor assembly 214 can be affixed to the common motor shaft 202 such that there is a gap between the outside surface of the secondary rotor assembly 214 and the inner surface of the secondary motor stator assembly 214. One or more permanent magnets can be affixed to the outer surface of the secondary rotor assembly 216 such that the permanent magnets are influenced by the magnetic field generated by the secondary motor stator assembly 214. The secondary rotor assembly 216 can be mounted inside the secondary motor stator assembly 214 on the common motor shaft 202.

Figure 3:
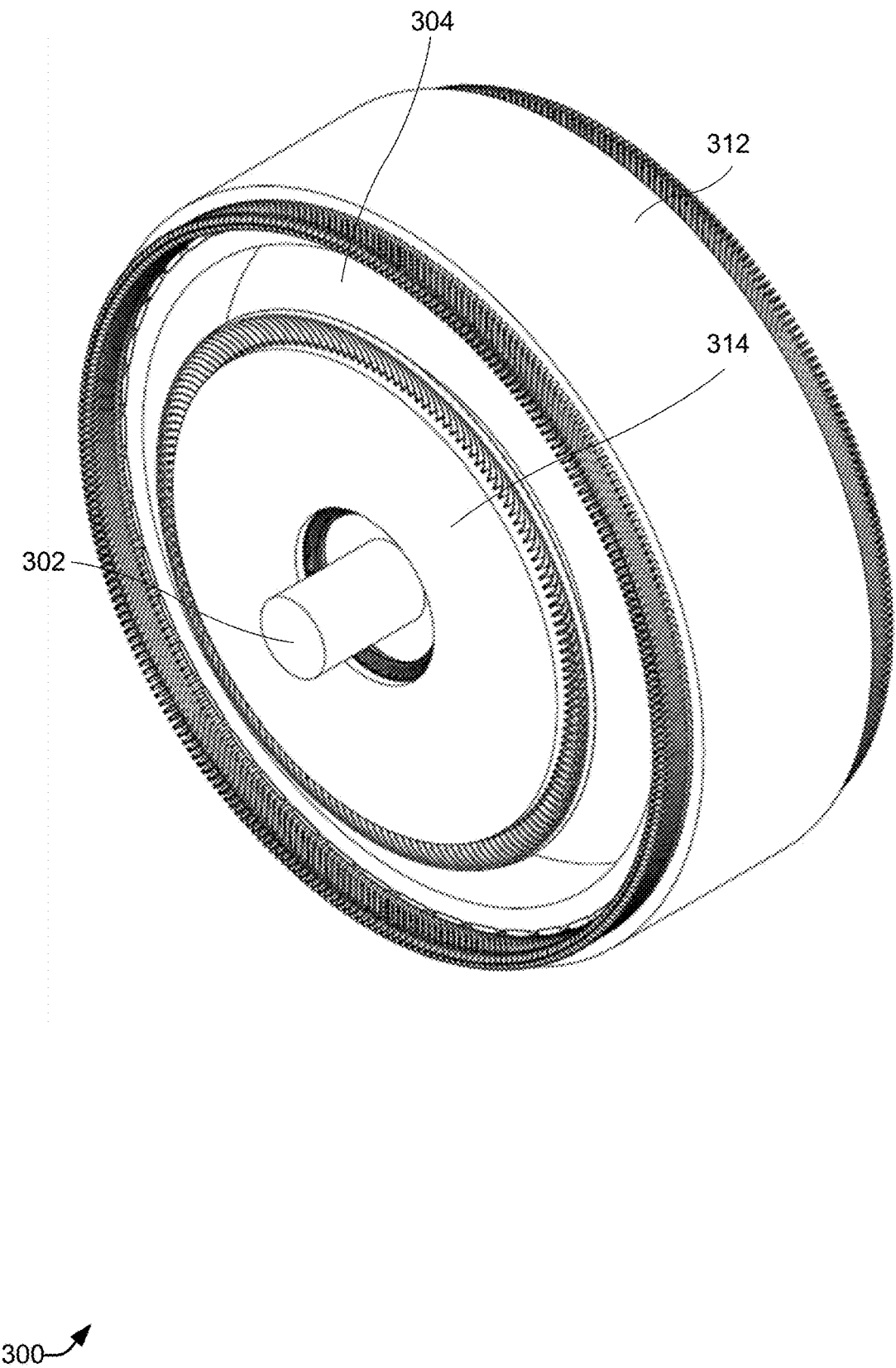
FIG. 3 illustrates an isometric view of a first configuration of a Radial-Axial propulsion motor according to an embodiment of the present invention.

FIG. 3 illustrates an isometric view of a first configuration of a Radial-Axial permanent magnet propulsion motor 300 with the motor housing removed according to an embodiment of the present invention. FIG. 3 illustrates the primary rotor assembly 304. The primary stator assembly 312 encircles the Radial-Flux permanent magnet motor 400. Secondary motor stator assembly 314 of the two secondary motor stator assemblies is illustrated in FIG. 3. The primary rotor assembly 304 can be seen inside the primary stator assembly 312. The common motor shaft 302 can be seen exiting a recess in the secondary motor stator assembly 314.

Figure 4:
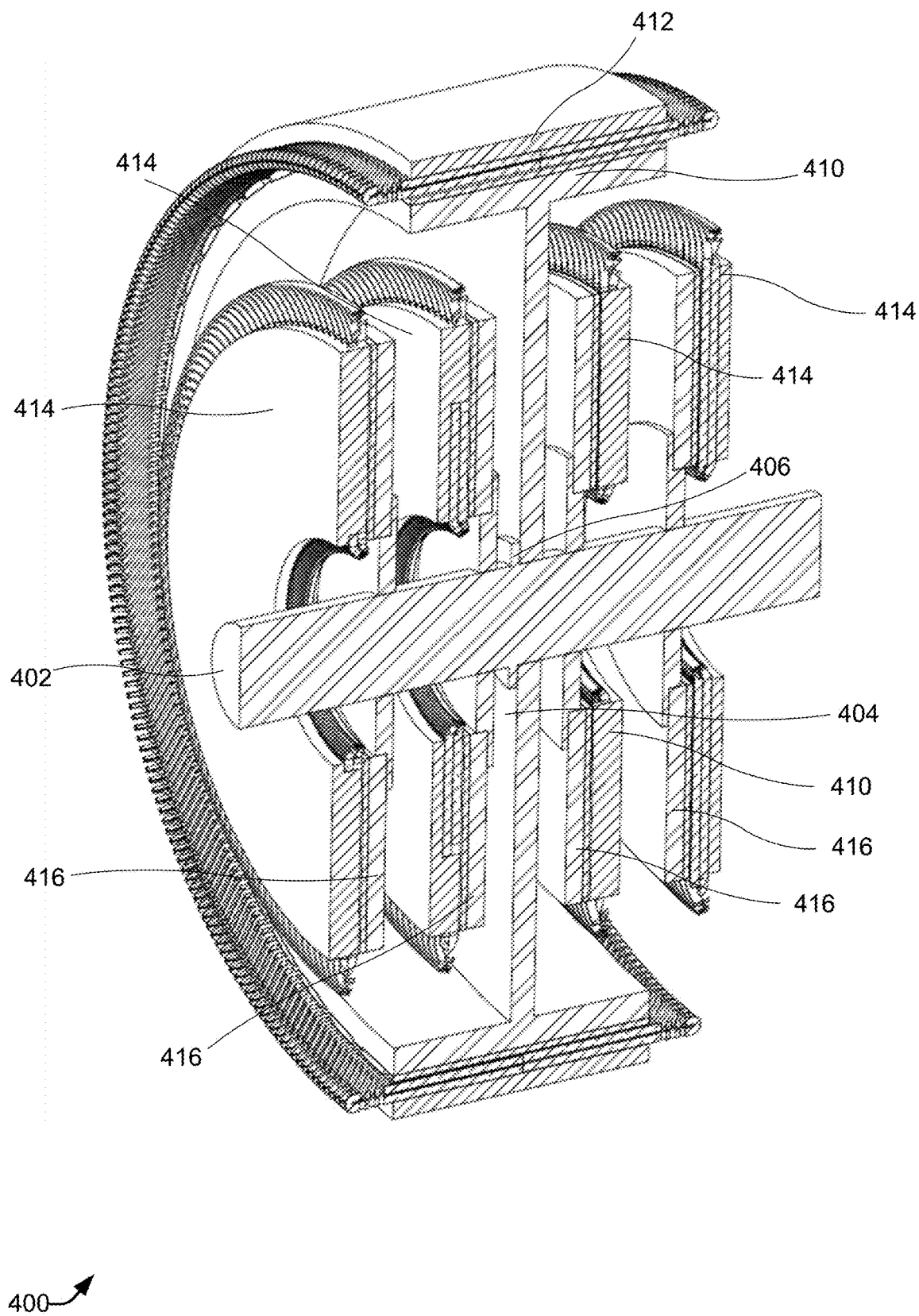
FIG. 4 illustrates an exemplary cutaway perspective view of a second configuration of a Radial-Axial propulsion motor according to an embodiment of the present invention.

FIG. 4 illustrates an exemplary a cutaway perspective view of a second configuration of a Radial-Axial propulsion motor driving a common motor shaft 402 according to an embodiment of the present invention. In a second configuration, the primary motor assembly 404 can include a radial flux permanent magnet motor. The secondary motors can include four axial-flux permanent magnet motors. Each of the four axial-flux permanent magnet motors can be individually controlled using a controller. The two additional axial-flux permanent magnet motors both increase the total torque generated by the Radial-Axial propulsion motor and allow for greater control of torque variations on the common shaft as compared with the first configuration of the Radial-Axial propulsion motor.

In this configuration, the additional secondary motors are contained within a single motor housing. Additionally secondary motors can be operated simultaneously, increasing torque production on the common shaft. Secondary motors can be operated a staggered arrangement, for an application with increasing or decreasing load, acting like an automotive gearbox. In this scenario, a single secondary motor is operated for light-load, high efficiency torque production; then as the load is ramped up, a second, secondary motor is activated. This load scenario is continued until all secondary motors, and the primary motor is actively producing torque on the common shaft. Conversely, the RADAX configuration could de-activate motors in the same fashion, as the torque requirement reduces.

Although not depicted, the second configuration of the RADAX motor can include a RADAX motor end wall and a motor frame. Inside the motor frame, a primary rotor assembly 404 can be attached to the common motor shaft 402. The primary rotor assembly 404 can include a round disc having an inner portion 406 at the center of the round disc and an outer portion 410 along the circumference of the round disc. The outer portion 410 of the primary rotor assembly 404 can be T-shaped and can include a rotor assembly surface that is perpendicular to the surface of the round disc. The primary rotor assembly 404 can be attached at the inner portion 406 of the primary motor assembly 404 to the common motor shaft 402. One or more permanent magnets can be affixed to the primary rotor assembly surface of the T-shaped end of the primary rotor assembly 404. A primary stator assembly 412 can be attached to the inside surface of the circular RADAX motor frame. The primary stator assembly 412 can be installed such there is an air gap between the primary rotor assembly 404 and the primary stator assembly 412. A first electric current can pass through the primary stator assembly 412 to generate a magnetic field. The magnetic field generated by the primary stator assembly 412 can influence the permanent magnetic affixed to the primary motor rotor surface causing a radial force to turn the common motor shaft 402.

The RADAX motor frame can include two RADAX motor end walls. A secondary motor stator assembly 414 can be affixed along the inner portion of each of the RADAX motor end walls. The secondary motor stator assembly 414 can include a circular stator encircling the common motor shaft 402. A second electric current can be applied to the secondary motor stator assembly 414 to generate a magnetic field that generates an axial magnetic flux. A secondary rotor assembly 416 can be mounted on common motor shaft 402 inside the secondary motor stator assembly 414 such that there is a gap between the outside surface of the secondary rotor assembly 416 and the inner surface of the secondary motor stator assembly 414. One or more permanent magnets can be affixed to the outer surface of the secondary rotor assembly 416 such that the permanent magnets are influenced by the magnetic field generated by the secondary motor stator assembly 414. In the second RADAX configuration, a third and fourth secondary motor stator assembly 414 and secondary rotor assembly 416 pairs can be installed inside the first and second secondary motor stator assembly 414 and secondary rotor assembly 416 pairs. The diameter for the third and fourth secondary motor stator assemblies 414 can be larger than the diameter for the first and secondary motor stator assemblies to mount the stator assembly on the RADAX motor end walls.

Figure 5:
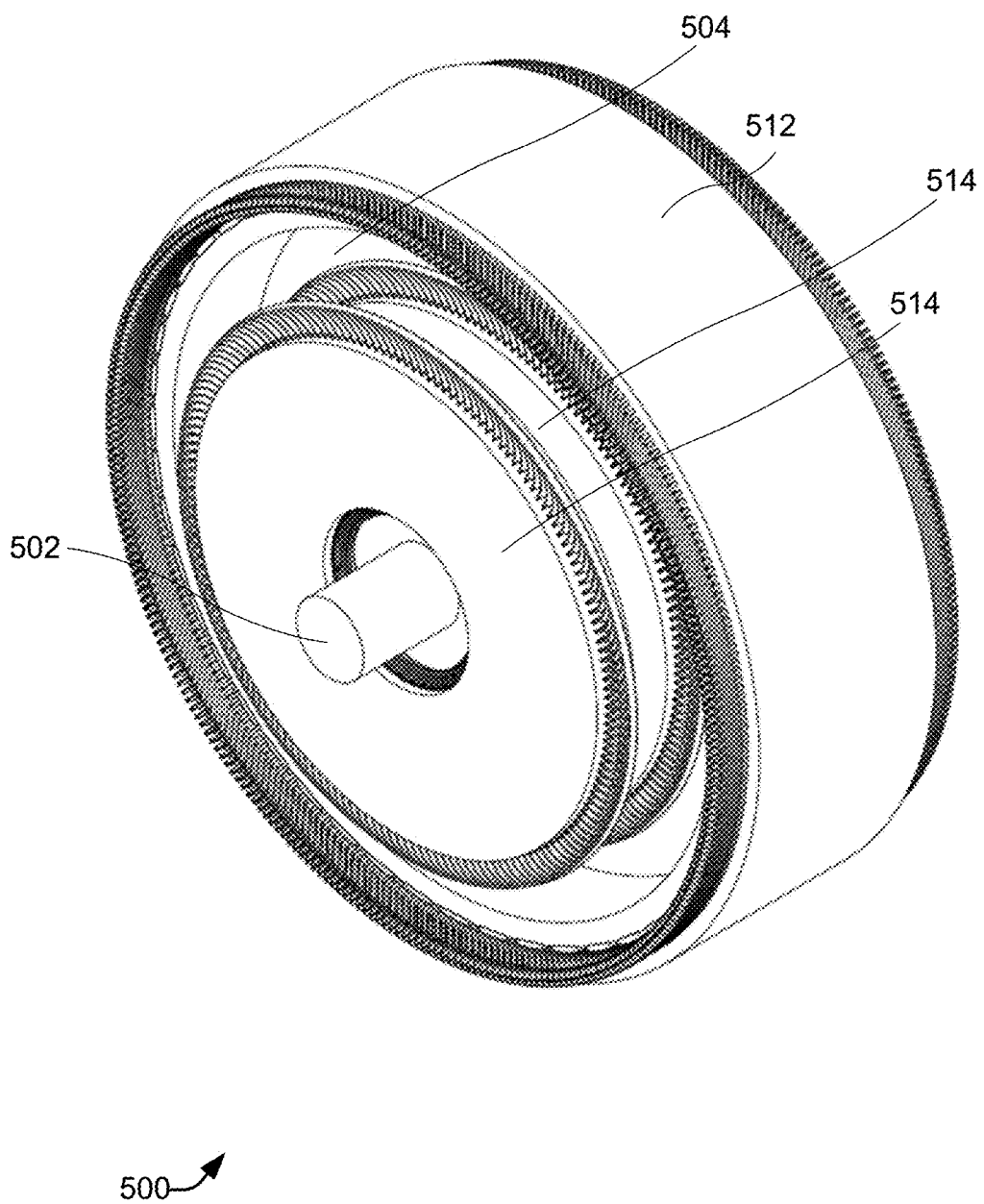
FIG. 5 illustrates an isometric view of a second configuration of a Radial-Axial propulsion motor according to an embodiment of the present invention.

FIG. 5 illustrates an isometric view of the second configuration of a Radial-Axial propulsion motor 500. FIG. 5 illustrates the primary rotor assembly 504 mounted on a common motor shaft 502. The primary stator assembly 512 encircles the Radial-Flux propulsion motor 500. As depicted in FIG. 5, the second configuration of the Radial-Axial propulsion motor includes multiple secondary motor stator assemblies 414, two of which can be seen in FIG. 5. The primary rotor assembly 504 can be seen inside the primary stator assembly 512. The common motor shaft 502 can be seen exiting a recess in the secondary motor stator assemblies 514.

Figure 6:
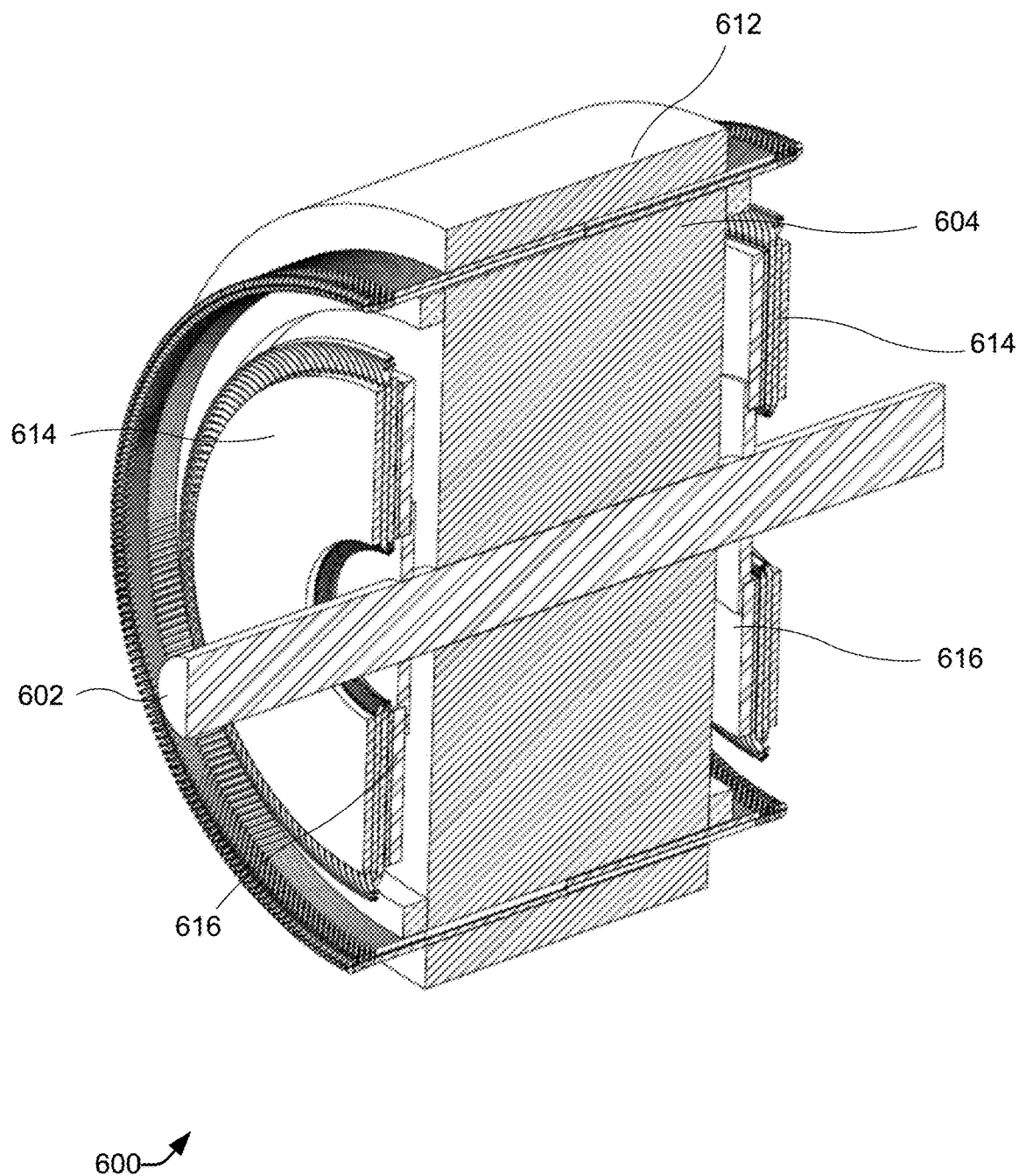
FIG. 6 illustrates an exemplary cutaway perspective view of a third configuration of a Radial-Axial propulsion motor according to an embodiment of the present invention.

FIG. 6 illustrates an exemplary cutaway perspective view of a third configuration of a Radial-Axial propulsion motor 600 according to an embodiment of the present invention. The third configuration of the Radial-Axial propulsion motor 600 can include a radial flux induction motor as the primary motor and two axial flux permanent magnet motors as the secondary motors. In the third configuration, the primary rotor assembly 604 can include a radial flux induction motor attached to the common motor shaft 602. A key advantage of AC induction motors is cost. The AC induction can be relatively inexpensive to build. AC induction designs use steel laminations in both the stator and rotor; these can be stamped almost simultaneously from the same sheet of material. In other words, the scrap rate is much lower than your average stamping job. In an AC induction motor the rotor always rotates at a lower speed than the cycling of the magnetic field. Permanent magnet motors tend to be more expensive than AC induction motors and have been known to be more difficult to start up than AC induction motors. However, the advantages of permanent magnet motors include higher efficiencies, smaller sizes (permanent magnet motors can be as much as one third of most AC motor sizes, which makes installation and maintenance much easier), and permanent magnet motor's ability to maintain full torque at low speeds.

The secondary, permanent magnet motor can be used to supplement the primary radial flux induction motors low load efficiency. Permanent magnet motors are more efficient than induction motors, because they do have windings on the rotor and thus do not produce rotor winding losses. Furthermore, the secondary motors are optimized for a lower torque operation, relative to the primary radial flux motor. As such, the primary motor can be de-energized during low torque operation, allowing one or more of the secondary motors to provide torque to the common motor shaft. In this arrangement, the optimized permanent magnet motors will produce torque more efficiently, reducing overall power consumption, relative to the primary radial flux motor operating alone.

The primary rotor assembly 604 includes one or more coils. A first electric current can be passed through the one or more coils to generate a magnetic field. A primary stator assembly 612 can be attached to the inside surface of the circular RADAX motor frame. The primary stator assembly 612 can be installed such there is an air gap between the primary rotor assembly 604 and the primary stator assembly 612. A second electric current can pass through the primary stator assembly 612 to generate a magnetic field. The magnetic field generated by the primary stator assembly 412 can influence the magnetic field generated by the primary rotor assembly 604 causing a radial force to turn the common motor shaft 402.

The RADAX motor frame can include two RADAX motor end walls. A secondary motor stator assembly 614 can be affixed along the inner portion of each of the two RADAX motor end walls. The secondary motor stator assembly 612 can include a circular stator assembly encircling the common motor shaft 602. A third current can be applied to the secondary motor stator assembly 614 to generate a magnetic field. A secondary rotor assembly 616 can be affixed to the common motor shaft 602 such that there is a gap between the outside surface of the secondary rotor assembly 616 and the inner surface of the secondary motor stator assembly 614. One or more permanent magnets can be affixed to the outer surface of the secondary rotor assembly 616 such that the permanent magnets are influenced by the magnetic field generated by the secondary motor stator assembly 614. The secondary rotor assembly 616 can be mounted inside the secondary motor stator assembly 614 on the common motor shaft 602.

Figure 7:
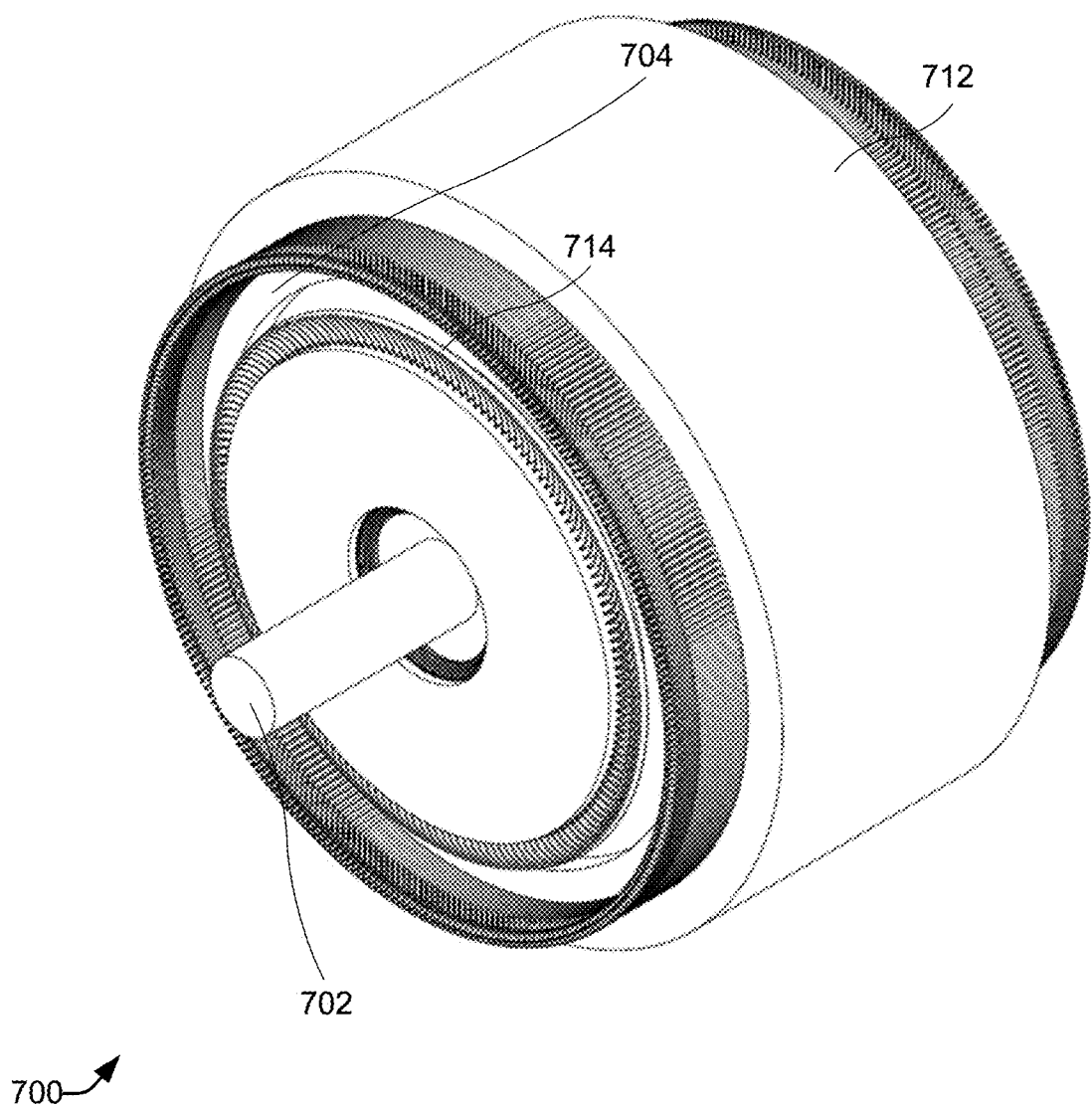
FIG. 7 illustrates an isometric view of a third configuration of a Radial-Axial propulsion motor according to an embodiment of the present invention.

FIG. 7 illustrates an isometric view of the third configuration of a Radial-Axial propulsion motor 700 according to an embodiment of the present invention. FIG. 7 illustrates the primary rotor assembly 704 mounted on a common motor shaft 702. The primary stator assembly 712 encircles the Radial-Flux propulsion motor 700. As depicted in FIG. 7, the third configuration of the Radial-Axial propulsion motor includes multiple secondary motor stator assemblies 714, one of which can be seen in FIG. 7. The primary rotor assembly 704 can be seen inside the primary stator assembly 712. The common motor shaft 702 can be seen exiting a recess in the secondary motor stator assemblies 714.

Figure 8:
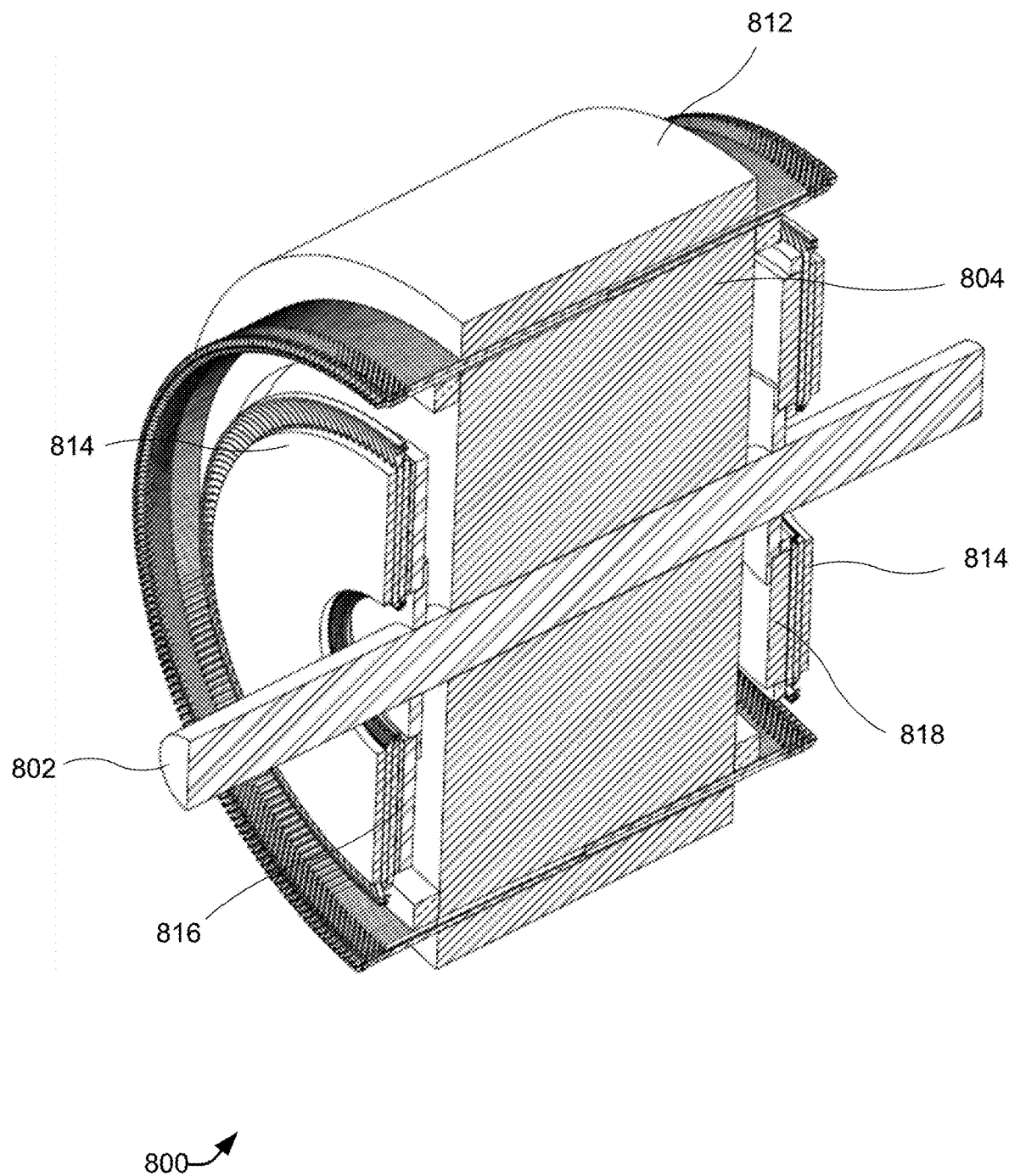
FIG. 8 illustrates an exemplary cutaway perspective view of a fourth configuration of a Radial-Axial propulsion motor according to an embodiment of the present invention.

FIG. 8 illustrates an exemplary cutaway perspective view of a fourth configuration of a Radial-Axial propulsion motor 800 according to an embodiment of the present invention. In a fourth configuration, the primary motor can be a radial flux induction motor and the secondary motors include an axial flux permanent magnet motor and an axial flux induction motor. In the fourth configuration, the primary rotor assembly 804 can include a radial flux induction motor attached to the common motor shaft 802. The advantages of a radial flux induction motor are discussed above with reference to the third configuration. The additional axial-flux permanent magnet motors and the axial flux induction motor increase the total torque generated by the Radial-Axial propulsion motor and allow for greater control of torque variations on the common shaft as compared with the first configuration of the Radial-Axial propulsion motor.

Similar to FIG. 6, this arrangement integrates two secondary motors which are optimized for low torque operation. As such, this arrangement can be operated in a similar manner, where the primary induction motor is de-energized while the secondary motors are operated more efficiently. Additional benefits include lower cost secondary motors, as induction motors are typically less costly than permanent magnet motors; as well as elimination of passive cogging torque, present in permanent magnet motors. When deactivated, the secondary motors of FIG. 6 will produce passive cogging torque and iron losses, due to the "always on" permanent magnets; In FIG. 8, the de-energized motors will not produce passive cogging torque, nor passive iron losses.

The primary rotor assembly 804 can include one or more coils. A first electric current can be passed through the one or more coils to generate a magnetic field. A primary stator assembly 812 can be attached to the inside surface of the circular RADAX motor frame. The primary stator assembly 812 can be installed such there is an air gap between the primary rotor assembly 804 and the primary stator assembly 812. A second electrical current can pass through the primary stator assembly 812 to generate a magnetic field. The magnetic field generated by the primary stator assembly 812 can influence the magnetic field generated by the primary rotor assembly 804 causing a radial force to turn the common motor shaft 802.

The RADAX motor frame can include two RADAX motor end walls. On one side of the RADAX motor, a secondary motor stator assembly 814 can be affixed along the inner portion of one of the two RADAX motor end walls. The secondary motor stator assembly 814 can include a circular stator assembly encircling the common motor shaft 802. A third current can be applied to the secondary motor stator assembly 814 to generate a magnetic field. A secondary rotor assembly 816 can be affixed to the common motor shaft 802 such that there is a gap between the outside surface of the secondary rotor assembly 816 and the inner surface of the secondary motor stator assembly 814. One or more permanent magnets can be affixed to the outer surface of the secondary rotor assembly 816 such that the permanent magnets are influenced by the magnetic field generated by the secondary motor stator assembly 814. The secondary rotor assembly 816 can be mounted inside the secondary motor stator assembly 814 on the common motor shaft 802.

On a second side of the RADAX motor, an axial flux induction motor can be installed. A secondary motor stator assembly 814 can be affixed along the inner portion of one of the two RADAX motor end walls. The secondary motor rotor assembly 818 can include an axial flux induction motor. The secondary motor rotor assembly 818 can include one or more coils. The secondary motor rotor assembly 818 can be affixed to the common motor shaft 802. A fourth electric current can be passed through the one or more coils to generate a magnetic field. There can be an air gap between the secondary motor rotor assembly 818 and the secondary motor stator assembly 814. A fifth electric current can also pass through the secondary motor stator assembly 814 to generate a magnetic field. The magnetic field generated by the secondary motor stator assembly 814 can influence the magnetic field generated by the secondary motor rotor assembly 818 causing a tangential to turn the common motor shaft 802.

Figure 9:
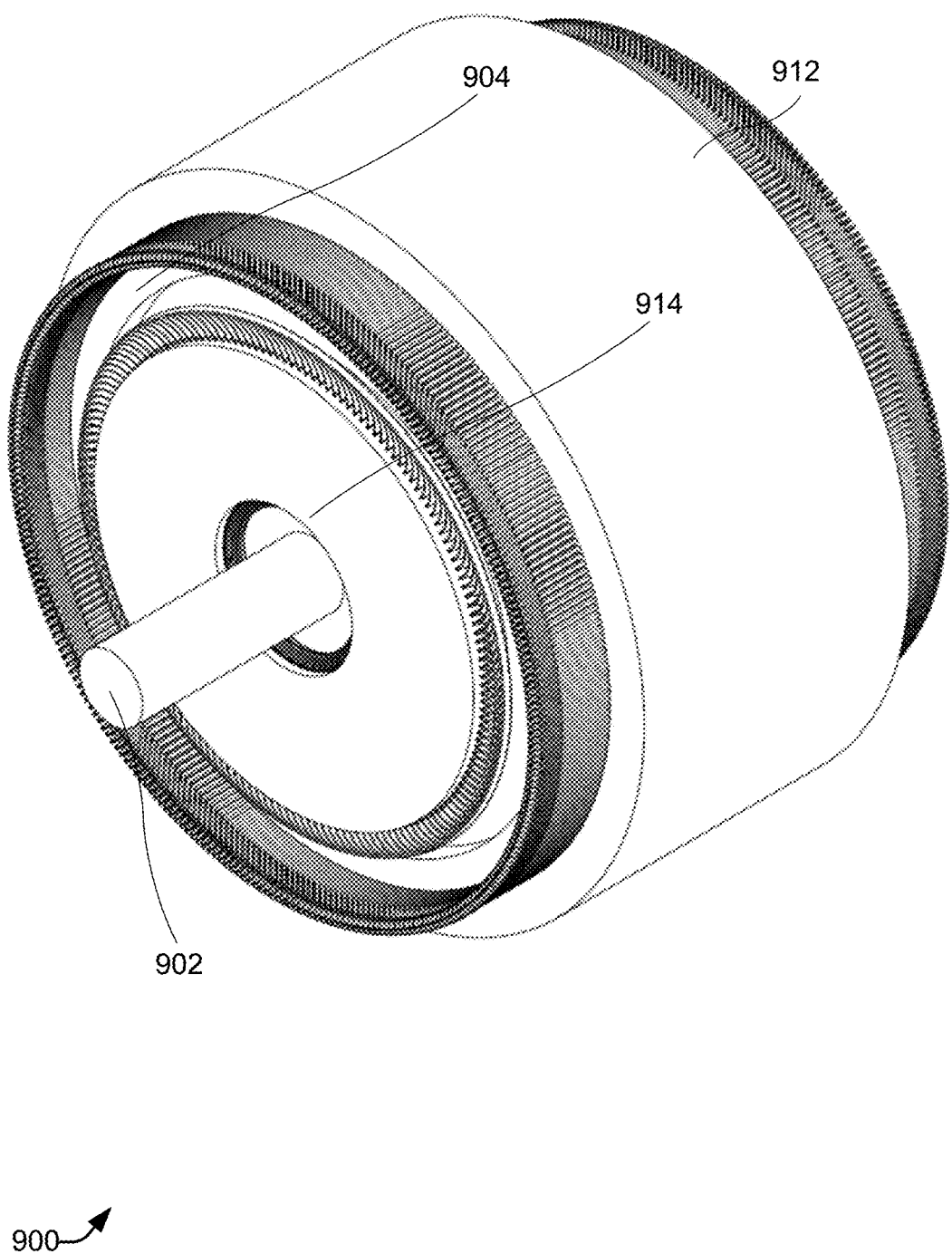
FIG. 9 illustrates an isometric view of a fourth configuration of a Radial-Axial propulsion motor according to an embodiment of the present invention.

FIG. 9 illustrates an isometric view of the fourth configuration of a Radial-Axial propulsion motor 900 according to an embodiment of the present invention. FIG. 9 illustrates the primary rotor assembly 904 mounted on a common motor shaft 902. The primary stator assembly 912 encircles the Radial-Flux propulsion motor 900. As depicted in FIG. 9, the third configuration of the Radial-Axial propulsion motor includes multiple secondary motor stator assemblies 914, one of which can be seen in FIG. 9. The primary rotor assembly 904 can be seen inside the primary stator assembly 912. The common motor shaft 902 can be seen exiting a recess in the secondary motor stator assemblies 914.

Figure 10:
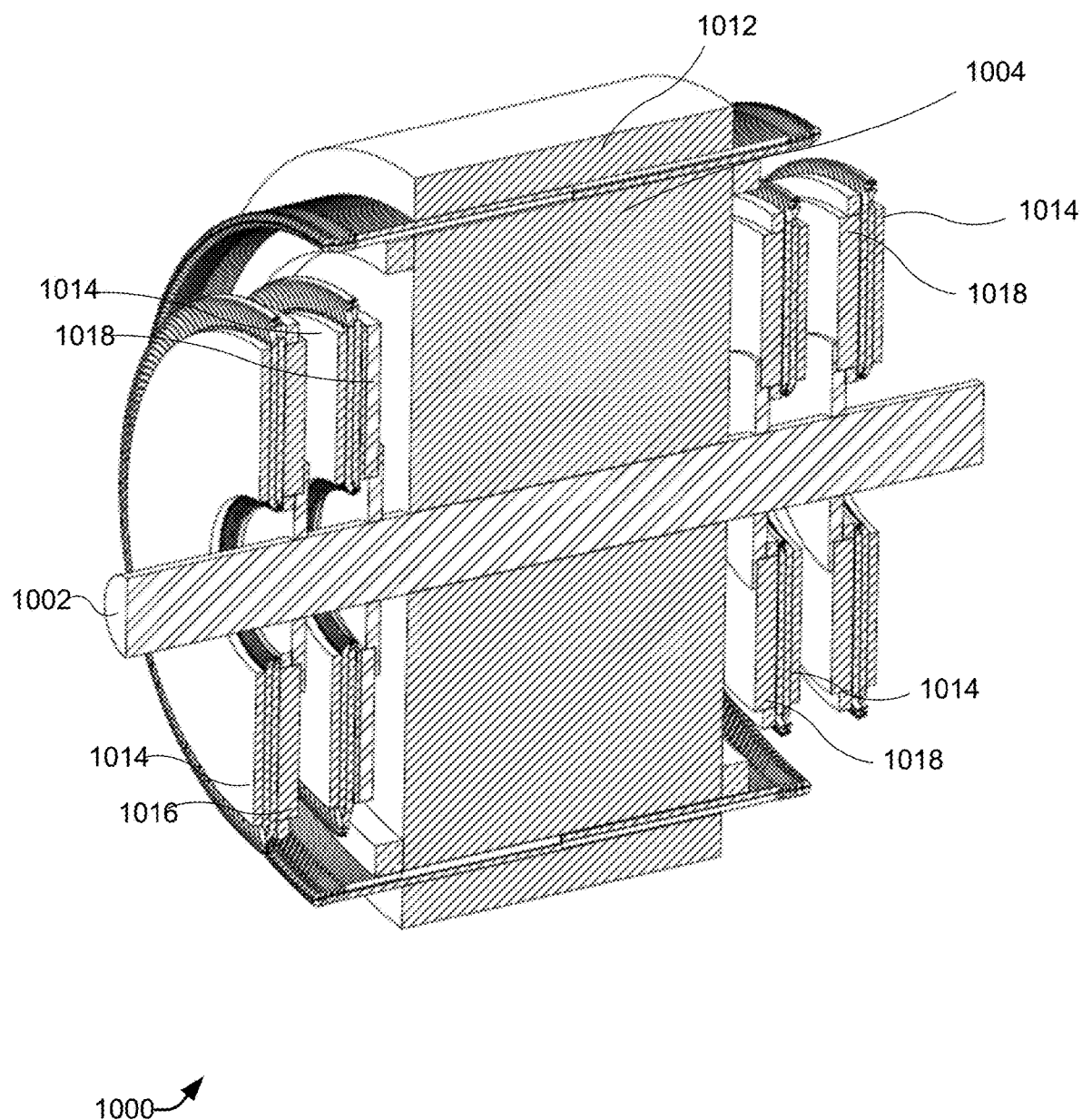
FIG. 10 illustrates an exemplary cutaway perspective view of a fifth configuration of a Radial-Axial propulsion motor according to an embodiment of the present invention.

FIG. 10 illustrates an exemplary cutaway perspective view of a fifth configuration of a Radial-Axial propulsion motor 1000 according to an embodiment of the present invention. In a fifth configuration, the primary motor can be a radial flux induction motor and the secondary motors can include an axial flux permanent magnet motor and three axial flux induction motors. As discussed above for the forth configuration, axial flux induction motors can be less expensive than similarly sized axial flux permanent magnet motors.

In this configuration, several lower cost induction motors are paired with a high-efficiency axial flux permanent magnet motor. This leverages the high efficiency afforded by the secondary permanent magnet motor, for the primary low-torque operation and lower cost secondary induction motors for other low-torque operating points, which do not require the primary radial flux motor. Additional benefits include the ability to passively generate power through the secondary permanent magnet motor, while the primary induction motor is producing torque or while the common motor shaft is braking.

In the fifth configuration, the primary rotor assembly 1004 can include a radial flux induction motor attached to the common motor shaft 1002. The primary rotor assembly 1004 can include one or more coils. A first electric current can be passed through the one or more coils to generate a magnetic field. A primary stator assembly 1012 can be attached to the inside surface of the circular RADAX motor frame. The primary stator assembly 1012 can be installed such there is an air gap between the primary rotor assembly 1004 and the primary stator assembly 1012. A second electric current can pass through the primary stator assembly 1012 to generate a magnetic field. The magnetic field generated by the primary stator assembly 1012 can influence the magnetic field generated by the primary rotor assembly 1004 causing a radial force to turn the common motor shaft 1002.

The RADAX motor frame can include two RADAX motor end walls. On one side of the RADAX motor, a secondary motor stator assembly 1014 can be affixed along the inner portion of one of the two RADAX motor end walls. The secondary motor stator assembly 1014 can include a circular stator assembly encircling the common motor shaft 1002. A current can be applied to the secondary motor stator assembly 1014 to generate a magnetic field. A secondary rotor assembly 1016 can be affixed to the common motor shaft 1002 such that there is a gap between the outside surface of the secondary rotor assembly 1016 and the inner surface of the secondary motor stator assembly 1014. One or more permanent magnets can be affixed to the outer surface of the secondary rotor assembly 1016 such that the permanent magnets are influenced by the magnetic field generated by the secondary motor stator assembly 1014. The secondary motor rotor assembly 1016 can be mounted inside the secondary motor stator assembly 1014 on the common motor shaft 1002.

On the same side as the axial flux permanent magnet motor, described above, an axial flux induction motor can be installed. A secondary motor stator assembly 1014 can be affixed along the inner portion of one of the two RADAX motor end walls. The secondary motor rotor assembly 1018 can include an axial flux induction motor. The secondary motor rotor assembly 1018 can include one or more coils. The secondary motor rotor assembly 1018 can be affixed to the common motor shaft 1002. A third electric current can be passed through the one or more coils to generate a magnetic field. There can be an air gap between the secondary motor rotor assembly 1018 and the secondary motor stator assembly 1014. A fourth electric current can also pass through the secondary motor stator assembly 1014 to generate a magnetic field. The magnetic field generated by the secondary motor stator assembly 1014 can influence the magnetic field generated by the secondary motor rotor assembly 1018 causing a tangential to turn the common motor shaft 1002.

On a second side of the RADAX motor, two axial flux induction motors can be installed. A secondary motor stator assembly 1014 can be affixed along the inner portion of one of the two RADAX motor end walls. The secondary motor rotor assembly 1018 can include an axial flux induction motor. The secondary motor rotor assembly 1018 can include one or more coils. The secondary motor rotor assembly 1018 can be affixed to the common motor shaft 1002. A first electric current can be passed through the one or more coils to generate a magnetic field. There can be an air gap between the secondary motor rotor assembly 1018 and the secondary motor stator assembly 1014. A second electric current can also pass through the secondary motor stator assembly 1014 to generate a magnetic field. The magnetic field generated by the secondary motor stator assembly 1014 can influence the magnetic field generated by the secondary motor rotor assembly 1018 causing a tangential to turn the common motor shaft 1002.

Figure 11:
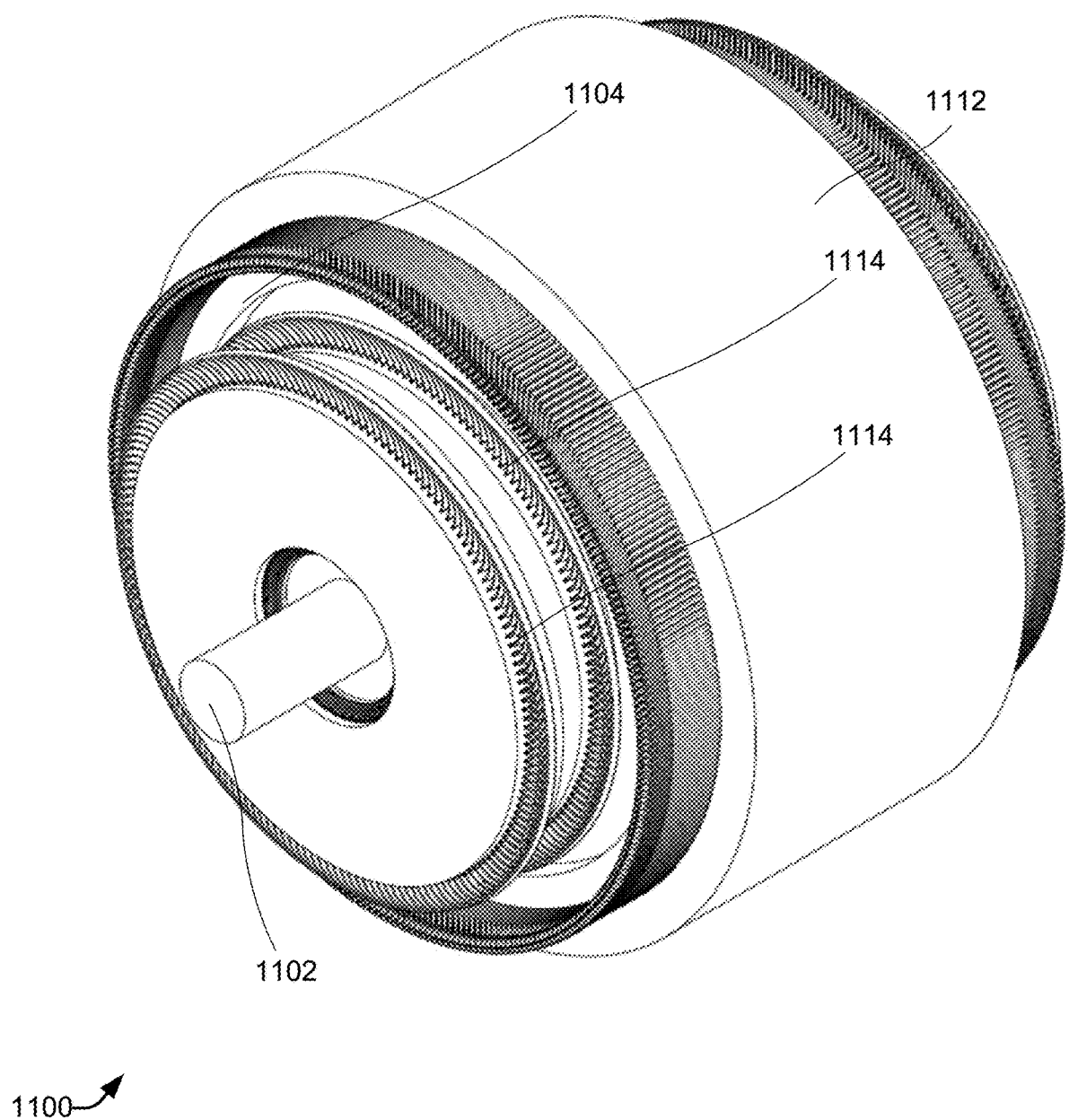
FIG. 11 illustrates an isometric view of a fifth configuration of a Radial-Axial propulsion motor according to an embodiment of the present invention.

FIG. 11 illustrates an isometric view of the fifth configuration of a Radial-Axial propulsion motor 1100 according to an embodiment of the present invention. FIG. 11 illustrates the primary rotor assembly 1104 mounted on a common motor shaft 1102. The primary stator assembly 1112 encircles the Radial-Flux propulsion motor 1100. As depicted in FIG. 11, the third configuration of the Radial-Axial propulsion motor includes multiple secondary motor stator assemblies 914, two of which can be seen in FIG. 11. The primary rotor assembly 1104 can be seen inside the primary stator assembly 1112. The common motor shaft 1102 can be seen exiting a recess in the secondary motor stator assemblies 1114.

Figure 12:
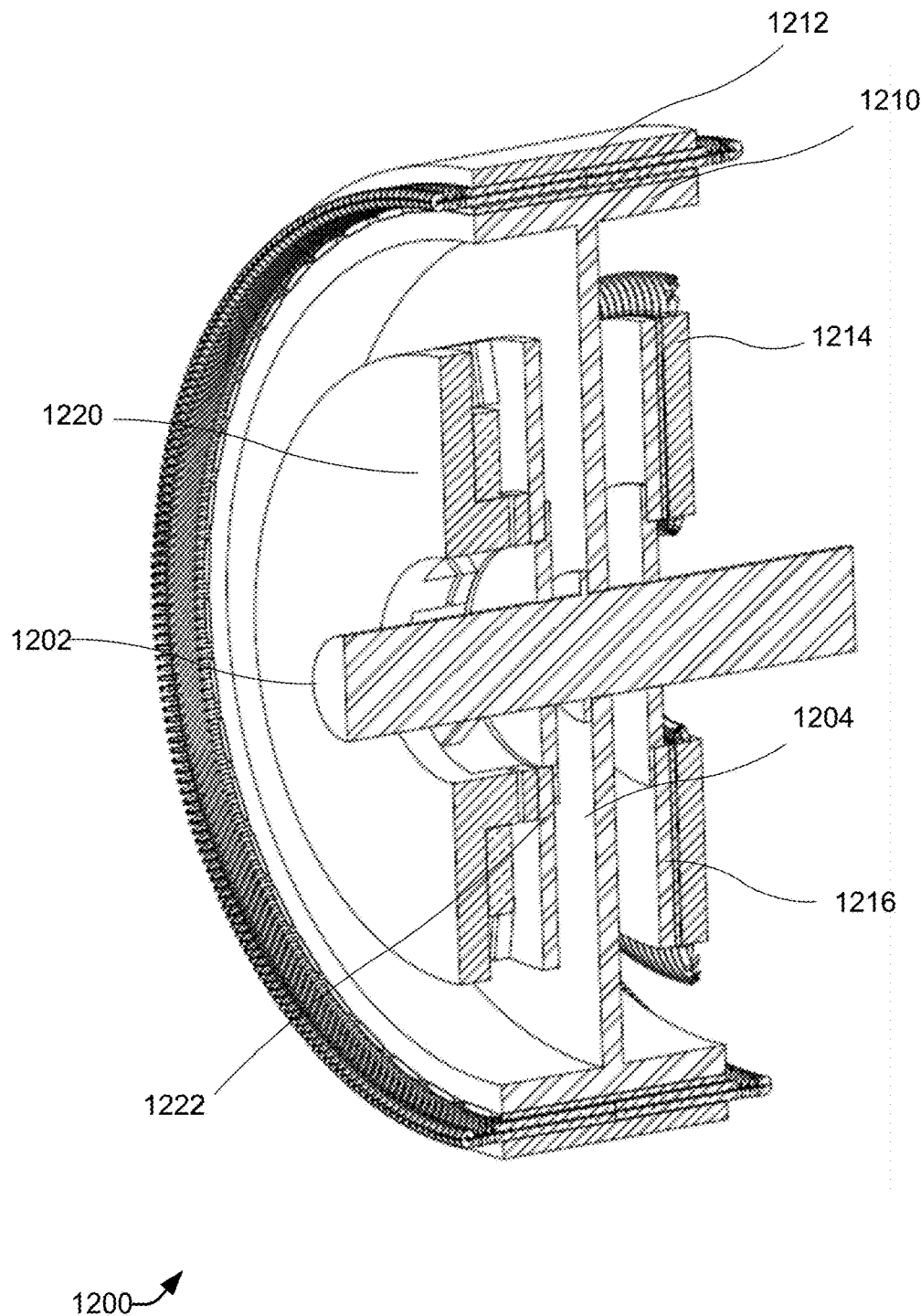
FIG. 12 illustrates an exemplary cutaway perspective view of a sixth configuration of a Radial-Axial propulsion motor according to an embodiment of the present invention.

FIG. 12 illustrates an exemplary cutaway perspective view of a sixth configuration of a Radial-Axial propulsion motor 1200 according to an embodiment of the present invention. In a sixth configuration, the primary motor can include a radial flux induction motor and the secondary motors can include an axial flux permanent magnet motor and a transverse flux motor. High torque density direct-drive electric machines are highly desirable as electric vehicle traction motors. Direct-drive machines have high torque at low speed, and they provide high reliability and low cost by eliminating the mechanical gearbox, which typically has low efficiencies. A transverse flux machine (TFM) is inherently suitable for direct-drive applications because of its high torque density. The distinct feature of a TFM is its "ring" shaped winding, which couples each stator core to the entire armature ampere-turns. As a result, high torque is achieved by increasing the pole number without sacrificing electric loading.

In this arrangement, the RADAX has been designed to accommodate different operating modes. Where low-speed, high-torque is required, the secondary transverse flux motor and/or primary radial flux motor are activated. Once the load torque requirement is reduced, the secondary permanent magnet motor is activated for low-load operation, increasing efficiency of the RADAX motor. This arrangement could be used for applications with large breakaway torque requirements, or large intermittent torque requirements, such as electric vehicle and aircraft.

The primary rotor assembly 1204 can include a round disc having an inner portion near the center of the round disc and an outer portion along the circumference of the round disc. The outer portion 1210 of the rotor assembly can be T-shaped and can include a rotor assembly surface. The primary rotor assembly 1204 can be attached at inner portion to the common motor shaft 1202. A permanent magnet can be affixed onto the outer portion 1210 on the rotor assembly surface of the T-shaped end of the rotor assembly 1204. A primary stator assembly 1212 can be attached to the inside surface of the circular RADAX motor frame. The primary stator assembly 1212 can be installed such there is an air gap between the primary rotor assembly 1204 and the primary stator assembly 1212. A first electric current can pass through the primary stator assembly 1212 to generate a magnetic field. The magnetic field generated by the primary stator assembly 1212 can influence the permanent magnetic affixed to the surface of the primary rotor assembly 1204 causing a radial force to turn the common motor shaft 1202.

A transverse flux motor can be included on one side of the primary rotor assembly 1204. A secondary transverse flux stator assembly 1220 can be attached to one side of the RADAX motor case. The transfer flux stator assembly 1220 can include a number of stator cores. Multiple coils pass through the stator cores and generate a magnetic field as current is applied. A rotor can be installed in the middle of the stator, and one or more permanent magnets can be affixed on the edge of the rotor such that the permanent magnets pass through a notch in the stator core. There can be an air gap between the permanent magnets and the stator core. A second electric current can pass through the secondary transverse flux stator assembly 1220 to generate a magnetic field. The magnetic field generated by the secondary transverse flux stator assembly 1220 can influence the permanent magnetic affixed to the secondary rotor assembly 1222 causing a transverse force to turn the common motor shaft 1202.

On the opposite side of the transverse flux motor, a secondary motor stator assembly 1214 can be affixed along the inner portion of the RADAX motor end walls. The secondary motor stator assembly 1214 can include a circular stator assembly encircling the common motor shaft 1202. A third electric current can be applied to the circular stator assembly 1214 to generate a magnetic field. A secondary rotor assembly 1216 can be affixed to the common motor shaft 1202 such that there is a gap between the outside surface of the secondary rotor assembly 1216 and the inner surface of the secondary motor stator assembly 1216. One or more permanent magnets can be affixed to the outer surface of the secondary rotor assembly 1216 such that the permanent magnets are influenced by the magnetic field generated by the secondary motor stator assembly 1214. The secondary rotor assembly 1216 can be mounted inside the secondary motor stator assembly on the common motor shaft 1202.

Figure 13:
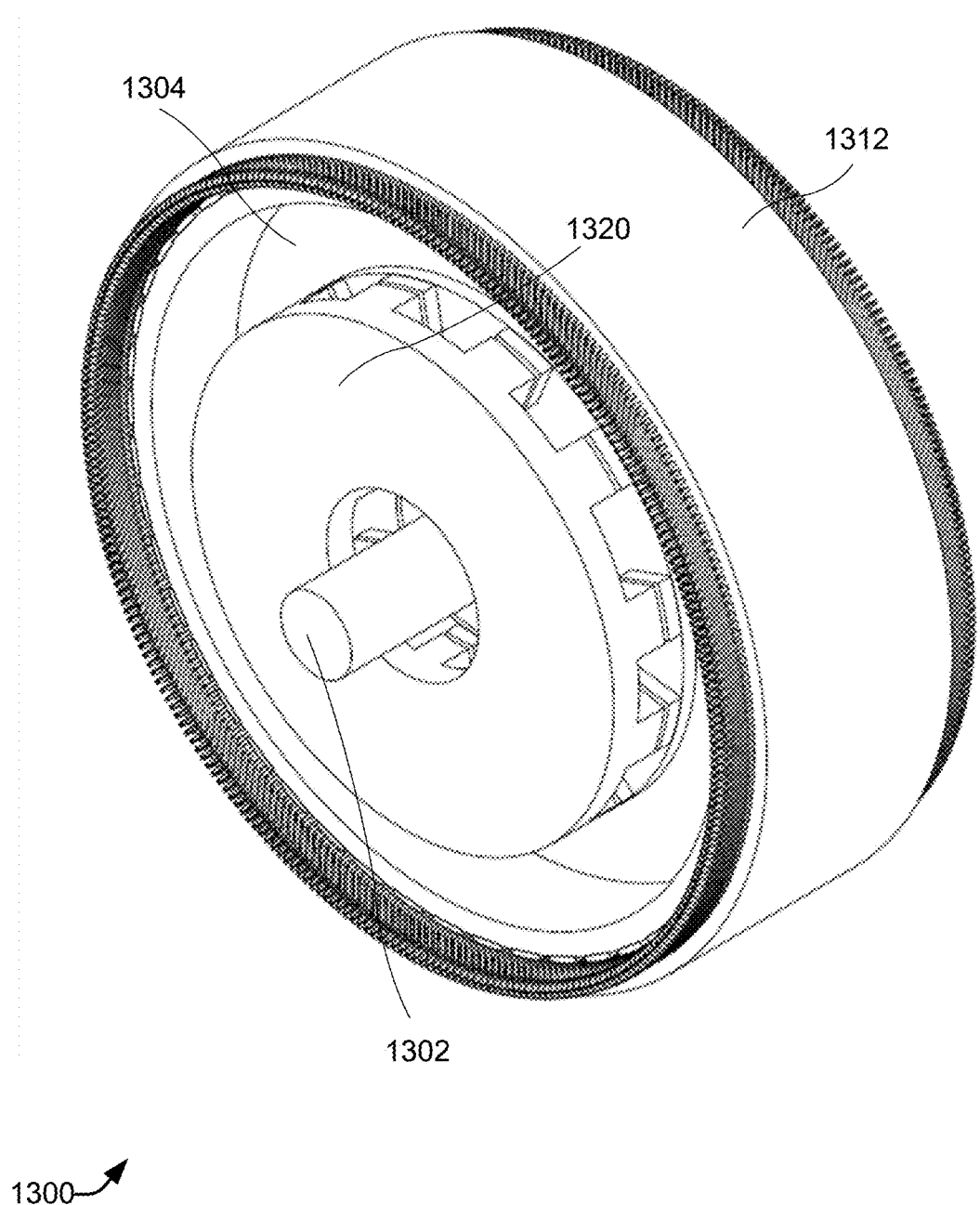
FIG. 13 illustrates an isometric view of a sixth configuration of a Radial-Axial propulsion motor according to an embodiment of the present invention.

FIG. 13 illustrates an isometric view of the sixth configuration of a Radial-Axial propulsion motor 1300 according to an embodiment of the present invention. FIG. 13 illustrates the primary rotor assembly 1304 mounted on a common motor shaft 1302. The primary stator assembly 1312 encircles the Radial-Flux propulsion motor 1300. As depicted in FIG. 13, the third configuration of the Radial-Axial propulsion motor can include secondary transverse flux stator assembly 1220. The primary rotor assembly 1304 can be seen inside the primary stator assembly 1312. The common motor shaft 1302 can be seen exiting a recess in the secondary transverse flux stator assembly 1320.

Figure 14:
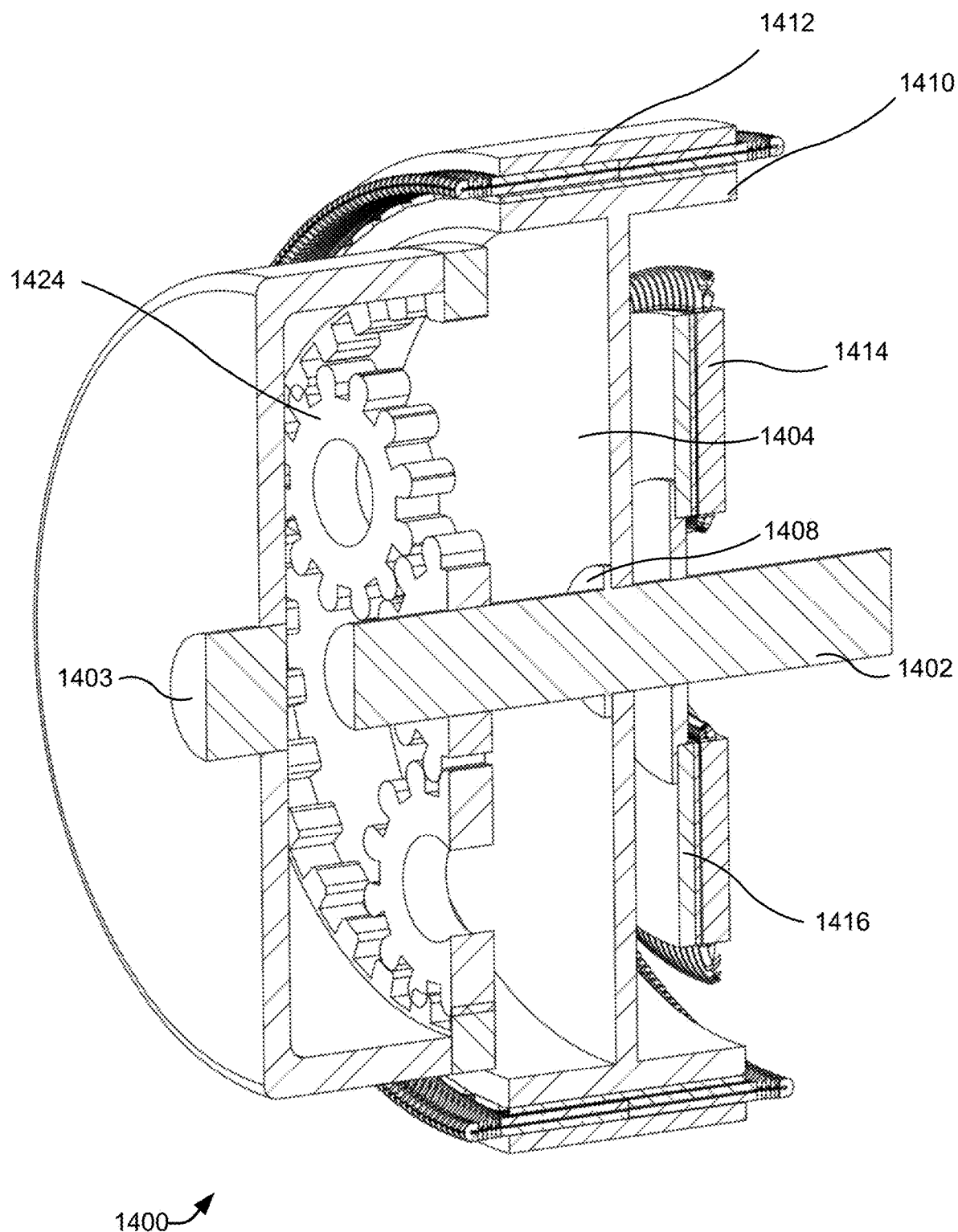
FIG. 14 illustrates an exemplary cutaway perspective view of a seventh configuration of a Radial-Axial propulsion motor according to an embodiment of the present invention.

FIG. 14 illustrates an exemplary cutaway perspective view of a seventh configuration of a Radial-Axial propulsion motor 1400 according to an embodiment of the present invention. In a seventh configuration, the primary motor can include a radial flux induction and the secondary devices can include an axial flux permanent magnet motor and a planetary gearbox. Inside the motor frame, a primary rotor assembly 1404 can be attached to the common motor shaft 1402.

This arrangement offers similar benefits as other RADAX, with the addition of a gearbox on the output. The integrated gearbox (planetary or other styles), amplifies the common RADAX shaft torque or speed, depending on gear selection. The addition of an integrated gear-set allows can allow a lower-torque motor to be utilized in an application, and can produce a more-compact RADAX solution.

The primary rotor assembly 1404 can include a round disc having an inner portion 1408 at the center of the round disc and an outer portion 1410 along the circumference of the round disc. The outer portion 1410 of the primary rotor assembly 1404 can be T-shaped and can include a rotor assembly surface that is perpendicular to the surface of the round disc. The primary rotor assembly 1404 can be attached at the inner portion 1408 of the primary rotor assembly 1404 to the common motor shaft 1402. One or more permanent magnets can be affixed to the primary rotor assembly surface of the T-shaped end of the primary rotor assembly 1404. A primary stator assembly 1412 can be attached to the inside surface of the circular RADAX motor frame. The primary stator assembly 1412 can be installed such there is an air gap between the primary rotor assembly 1404 and the primary stator assembly 1412. A first electric current can pass through the primary stator assembly 1412 to generate a magnetic field. The magnetic field generated by the primary stator assembly 1412 can influence the permanent magnetic affixed to the primary motor rotor surface causing a radial force to turn the common motor shaft 1402.

In the seventh configuration of a Radial-Axial propulsion motor 1400 illustrated in FIG. 14, a planetary gearbox 1424 is installed on one side of the primary rotor assembly 1404. The planetary gearbox 1424 is a gearbox with the common motor shaft 1402 and the output shaft 1403 aligned. A planetary gearbox 1424 is used to transfer the largest torque in the most compact form (known as torque density).

On the opposite side of the planetary gearbox 1424, a secondary motor stator assembly 1414 can be affixed along the inner portion of the RADAX motor end walls. The secondary motor stator assembly 1414 can include a circular stator assembly encircling the common motor shaft 1402. A first electric current can be applied to the circular stator assembly 1414 to generate a magnetic field. A secondary rotor assembly 1416 can be affixed to the common motor shaft 1402 such that there is a gap between the outside surface of the secondary rotor assembly 1416 and the inner surface of the secondary motor stator assembly 1414. One or more permanent magnets can be affixed to the outer surface of the secondary rotor assembly 1416 such that the permanent magnets are influenced by the magnetic field generated by the secondary motor stator assembly 1414. The secondary rotor assembly 1416 can be mounted inside the secondary motor stator assembly on the common motor shaft 1402.

Figure 15:
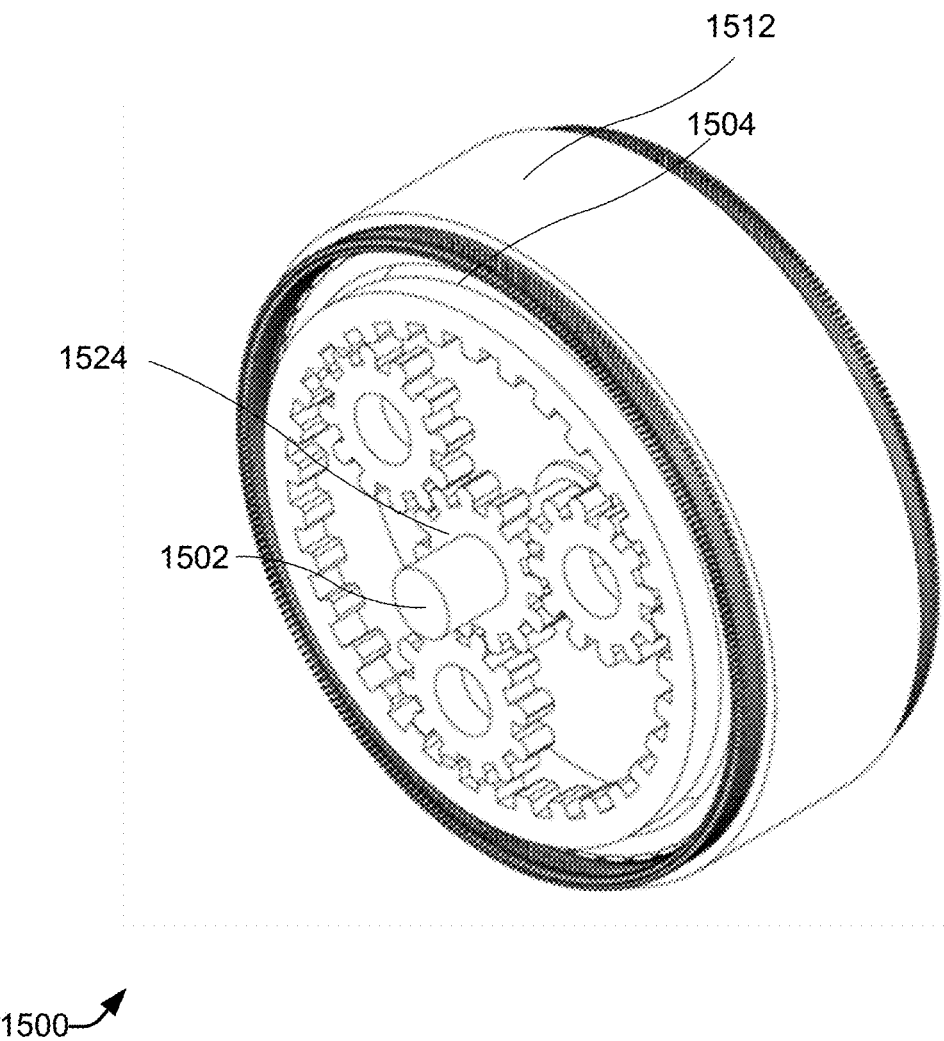
FIG. 15 illustrates an isometric view of a seventh configuration of a Radial-Axial propulsion motor according to an embodiment of the present invention.

FIG. 15 illustrates an isometric view of the seventh configuration of a Radial-Axial propulsion motor 1500 according to an embodiment of the present invention. FIG. 15 illustrates the primary rotor assembly 1504 mounted on a common motor shaft 1502. The primary stator assembly 1512 encircles the Radial-Flux propulsion motor 1500. As depicted in FIG. 15, the seventh configuration of the Radial-Axial propulsion motor can include planetary gearbox 1424. The primary rotor assembly 1504 can be seen inside the primary stator assembly 1512. The common motor shaft 1502 can be seen exiting a recess in the planetary gearbox 1524.

Figure 16:
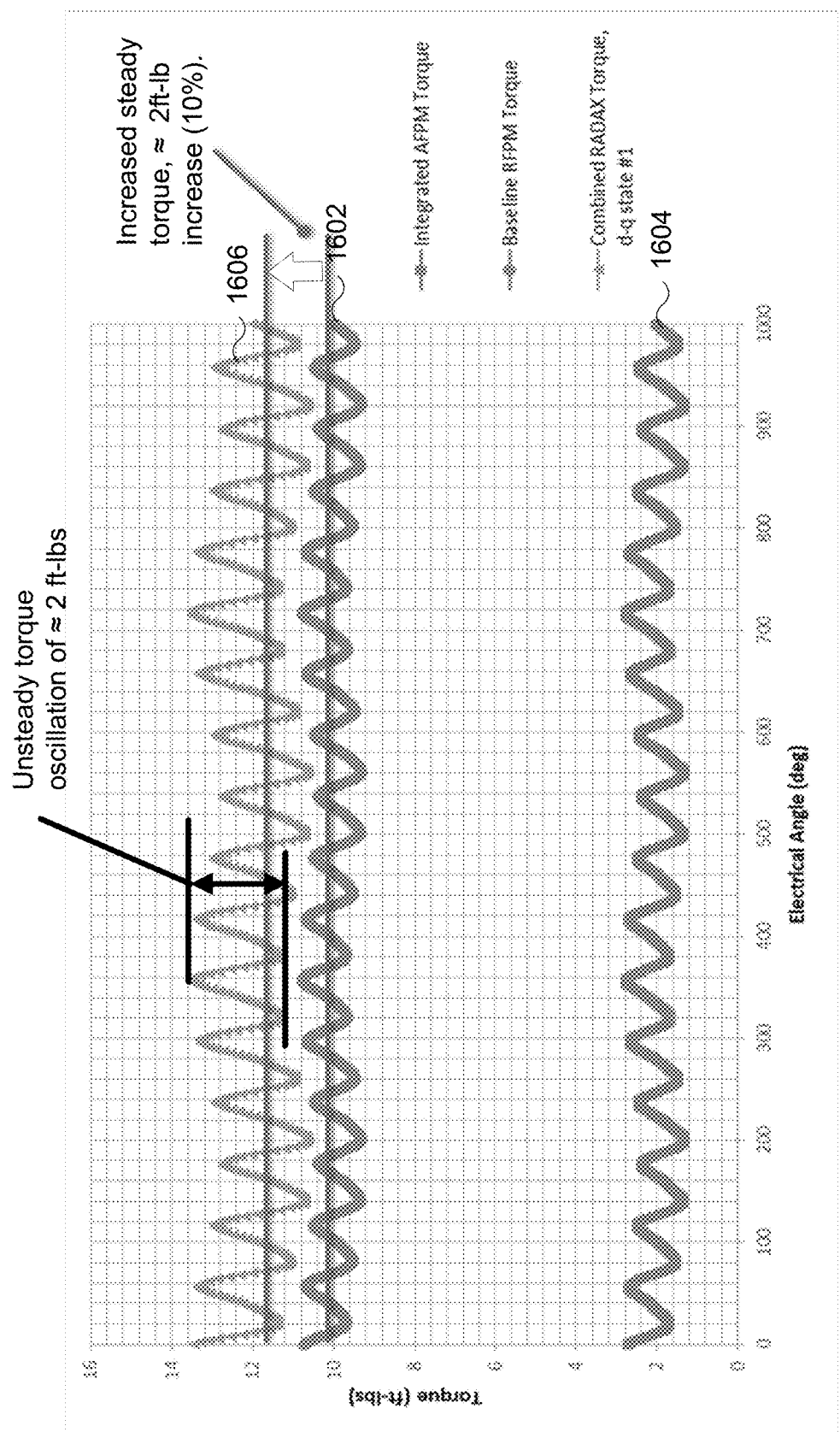
FIG. 16 illustrates a plot of torque versus electrical angle for a first state for a Radial-Axial propulsion motor according to an embodiment of the present invention.
Figure 17:
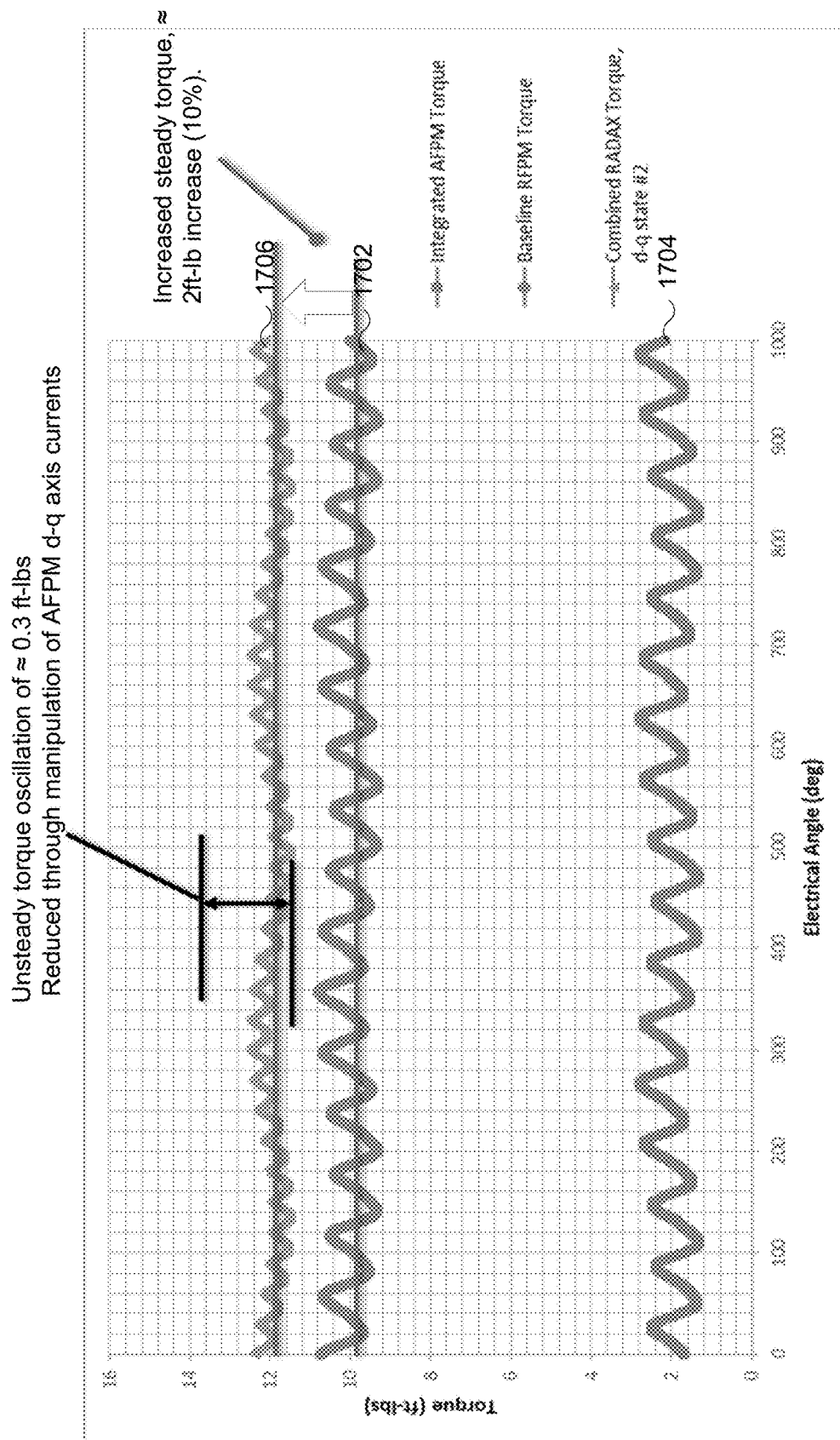
FIG. 17 illustrates a plot of torque versus electrical angle for a second state for a Radial-Axial propulsion motor according to an embodiment of the present invention.

FIG. 16 illustrates a plot 1600 of torque versus electrical angle for a first state for a Radial-Axial propulsion motor including a radial flux induction primary motor and an axial flux permanent magnet motor according to an embodiment of the present invention. FIG. 16 illustrates baseline radial flux torque plot 1602 versus electrical angle (in degrees) for the radial flux propulsion motor similar to the radial flux induction motor in the fourth configuration as shown in FIG. 6. As shown in FIG. 16, the torque produced by the axial flux propulsion motors can combine with the torque produced by the radial flux induction primary motor to produce an integrated torque 1606 associated with the Radial-Axial propulsion motor. The integrated torque from the axial flux propulsion motors can increase steady combined integrated torque 1606. In some implementations the increase in combined integrated torque 1606 can be about 10%. Based on the d-q axis current of the axial flux propulsion motor(s), the combined torque can be unsteady and can result in oscillation (e.g., approximately 2 foot-pounds). The oscillation of the torque is undesirable because it can result in increased vibrations. The increased vibrations can increase the sound signature of the vessel making the vessel more detectable and identifiable. As shown in FIG. 17, the q-axis and d-axis can be adjusted to reduce these torque oscillations and still produce and increase in average torque over the primary radial motor alone.

FIG. 17 illustrates a plot 1700 of torque versus electrical angle for a second state for a Radial-Axial propulsion motor including a radial flux induction primary motor and an axial flux permanent magnet motor. FIG. 17 illustrates baseline radial flux torque plot 1702 versus electrical angle (in degrees) for the radial flux induction propulsion motor. As shown in FIG. 17, the axial flux propulsion motors can combine with the radial flux force produced by the radial flux induction motor to produce an integrated torque 1706. The torque from the axial flux propulsion motors can increase the steady combined RADAX torque 1706. In some implementations the increase in combined RADAX torque 1706 can be about 10%. FIG. 17 illustrates that by adjustment of the d-axis current and q-axis current of the axial flux propulsion motor(s), the unsteadiness of combined torque can be reduced from 2 foot-pounds as shown in FIG. 16, approximately 0.3 foot-pounds while still providing an average integrated torque 1706 increase of about 2 foot-pounds (approximately 10%).

Figure 18:
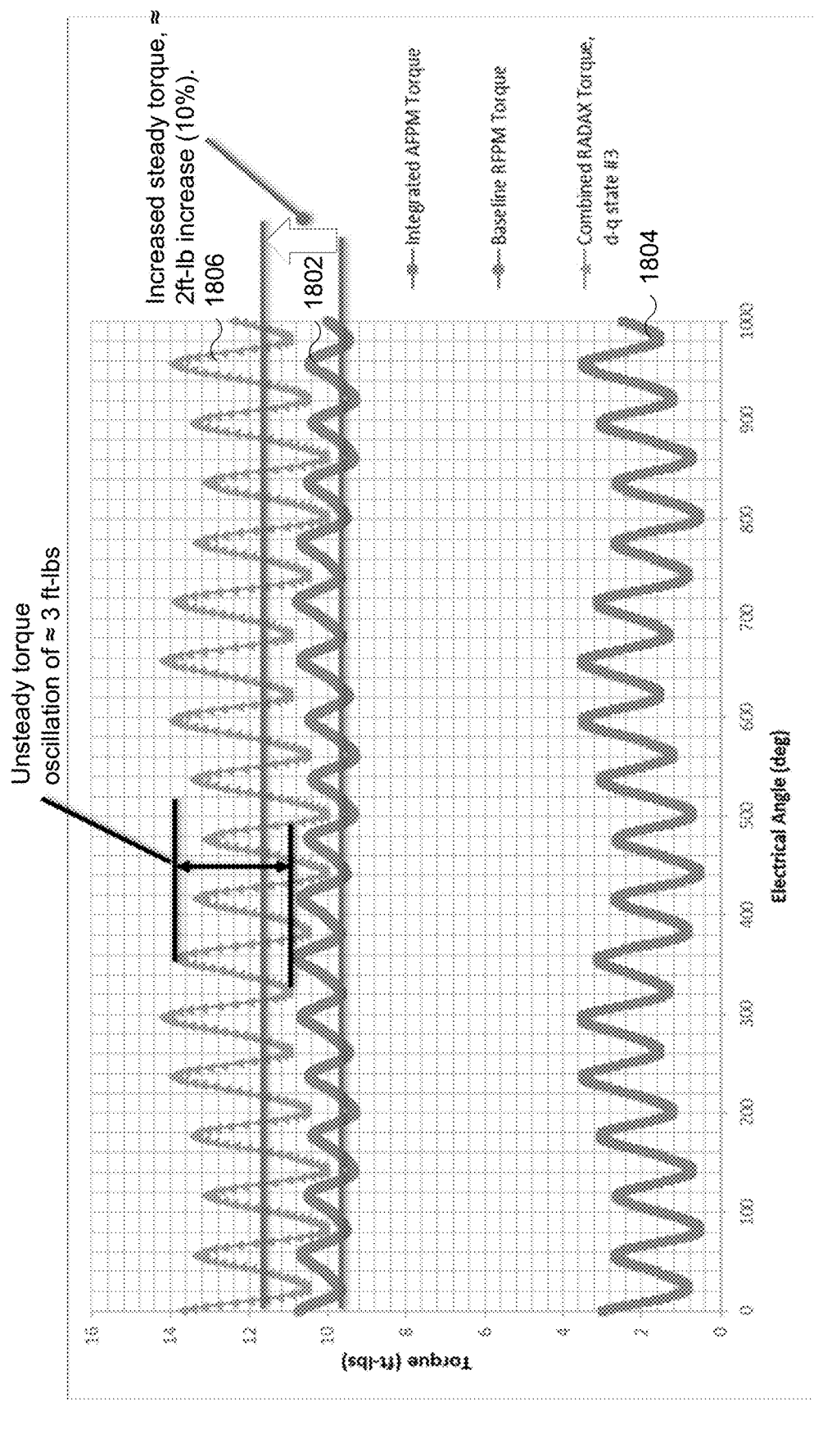
FIG. 18 illustrates a plot of torque versus electrical angle for a third state for a Radial-Axial propulsion motor according to an embodiment of the present invention.

FIG. 18 illustrates a plot of torque versus electrical angle for a third state for a Radial-Axial propulsion motor including a radial flux induction primary motor and an axial flux permanent magnet motor. FIG. 18 illustrates baseline radial flux torque plot 1802 versus electrical angle (in degrees) for the radial propulsion motor. As shown in FIG. 18, the axial flux propulsion motors can combine with the radial flux force to produce an integrated torque 1804. The integrated torque from the axial flux propulsion motors can increase steady combined RADAX torque 1806. As the d-axis and q-axis current are further adjusted the integrated torque 1806 can be increased about 10%. However, due to the d-axis and q-axis currents of the axial flux propulsion motor(s), the combined torque can be unsteady and can result in oscillation (e.g., approximately 3 foot-pounds). The torque fluctuations can be undesirable as stated above. Therefore having independent control of the radial and axial motors can provide a means for reducing the integrated torque fluctuations.

Figure 19:
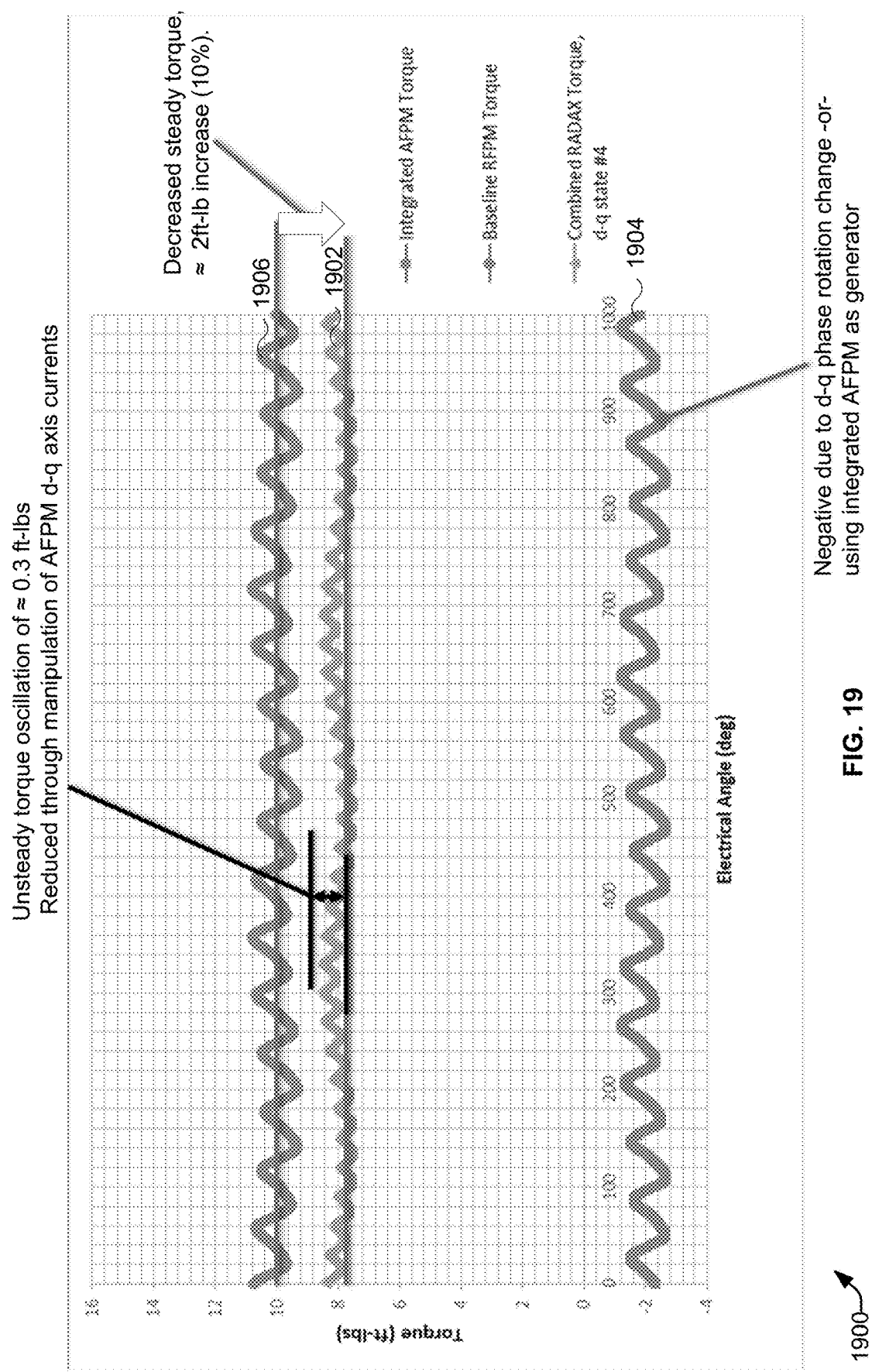
FIG. 19 illustrates a plot of torque versus electrical angle for a fourth state for a Radial-Axial propulsion motor according to an embodiment of the present invention.

FIG. 19 illustrates a plot of torque versus electrical angle for a fourth state for a Radial-Axial propulsion motor including a radial flux induction primary motor and an axial flux permanent magnet motor. FIG. 19 illustrates baseline radial flux torque plot 1902 versus electrical angle (in degrees) for the radial propulsion motor. As shown in FIG. 19, the axial flux propulsion motors can combine with the radial flux force to produce an integrated torque 1904. As shown in FIG. 19, the contribution of the axial flux propulsion motor can be negative due to d-q phase rotation change or using the integrated axial flux propulsion motor as a generator. The integrated torque from the axial flux propulsion motors can reduce steady combined RADAX torque 1906. In some implementations the decrease in combined RADAX torque 1906 can be about 10%. FIG. 19 illustrates that by adjustment of the d-q axis current of the axial flux propulsion motor(s), the unsteadiness of combined torque can be reduced and can result in reduced combine torque oscillation (e.g., approximately 0.3 foot-pounds). FIG. 19 illustrates another advantage of the Radial-Axial Flux motor for fine tuning torque output and for reducing torque fluctuations.

Figure 20:
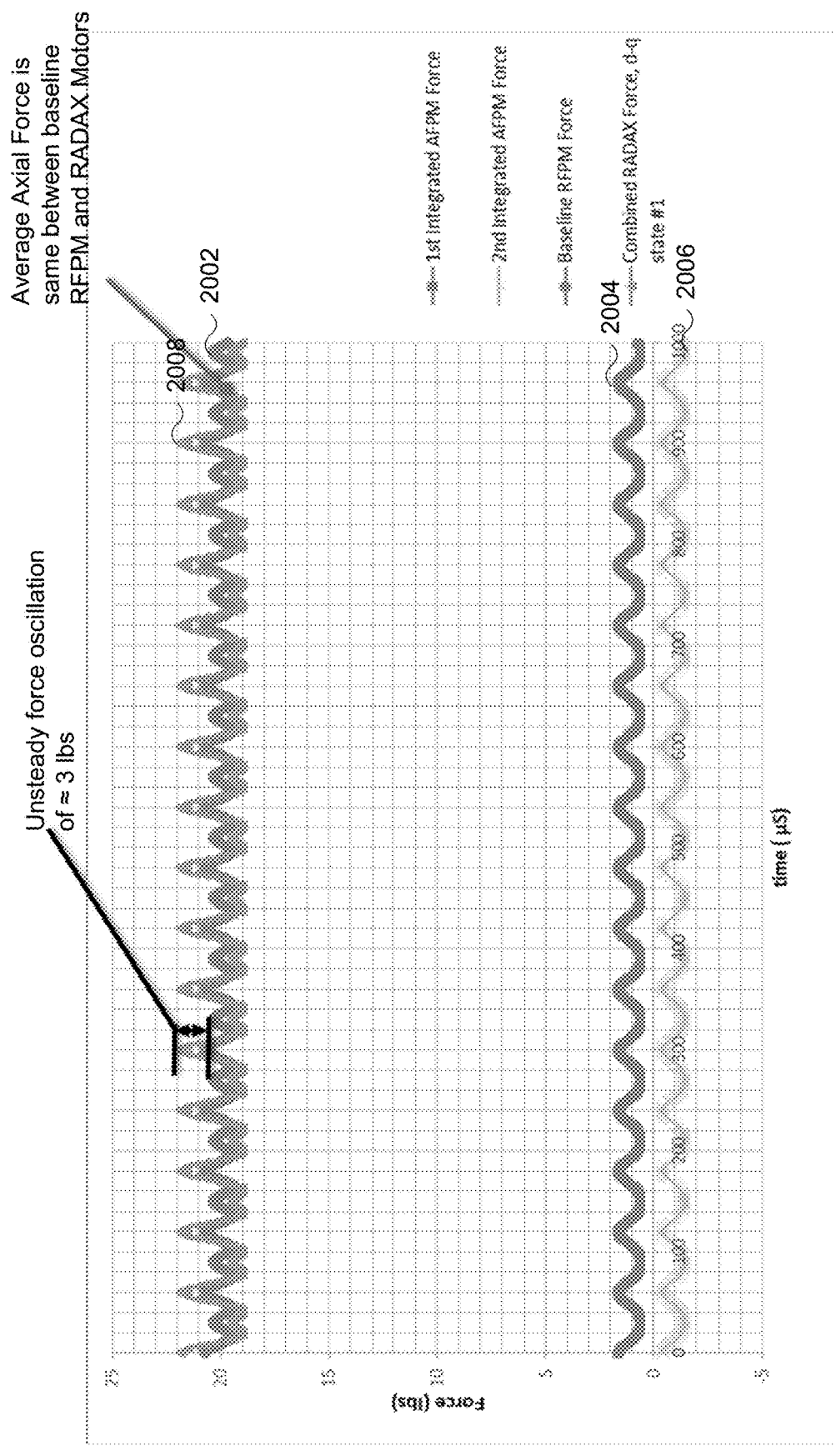
FIG. 20 illustrates a Force plot over time for a first state for a Radial-Axial propulsion motor according to an embodiment of the present invention.

FIG. 20 illustrates a Force plot over time for a first state for a Radial-Axial propulsion motor including a radial flux induction propulsion motor for the primary motor and two axial flux permanent magnet motors for the secondary motors. FIG. 20 illustrates baseline radial flux torque plot 2002 versus time for the radial flux induction propulsion motor. A first axial flux torque 2004 from a first axial flux propulsion motor can be combined with a second axial flux torque 2006 from a second axial flux propulsion motor. In a first d-q state for the first and second axial flux propulsion motors, the first axial flux torque 2004 and second axial flux torque 2006 appear to be in phase. The radial flux torque 2002 also appears to be in phase with the first axial flux torque 2004 and second axial flux torque 2006. As shown in FIG. 20, the axial flux propulsion motors can combine with the radial flux torque 2002 to produce an integrated torque 2008. The integrated torque 2008 also appears to be in phase with the radial flux torque 2002, the first axial flux torque 2004, and the second axial flux torque 2006.

Figure 21:
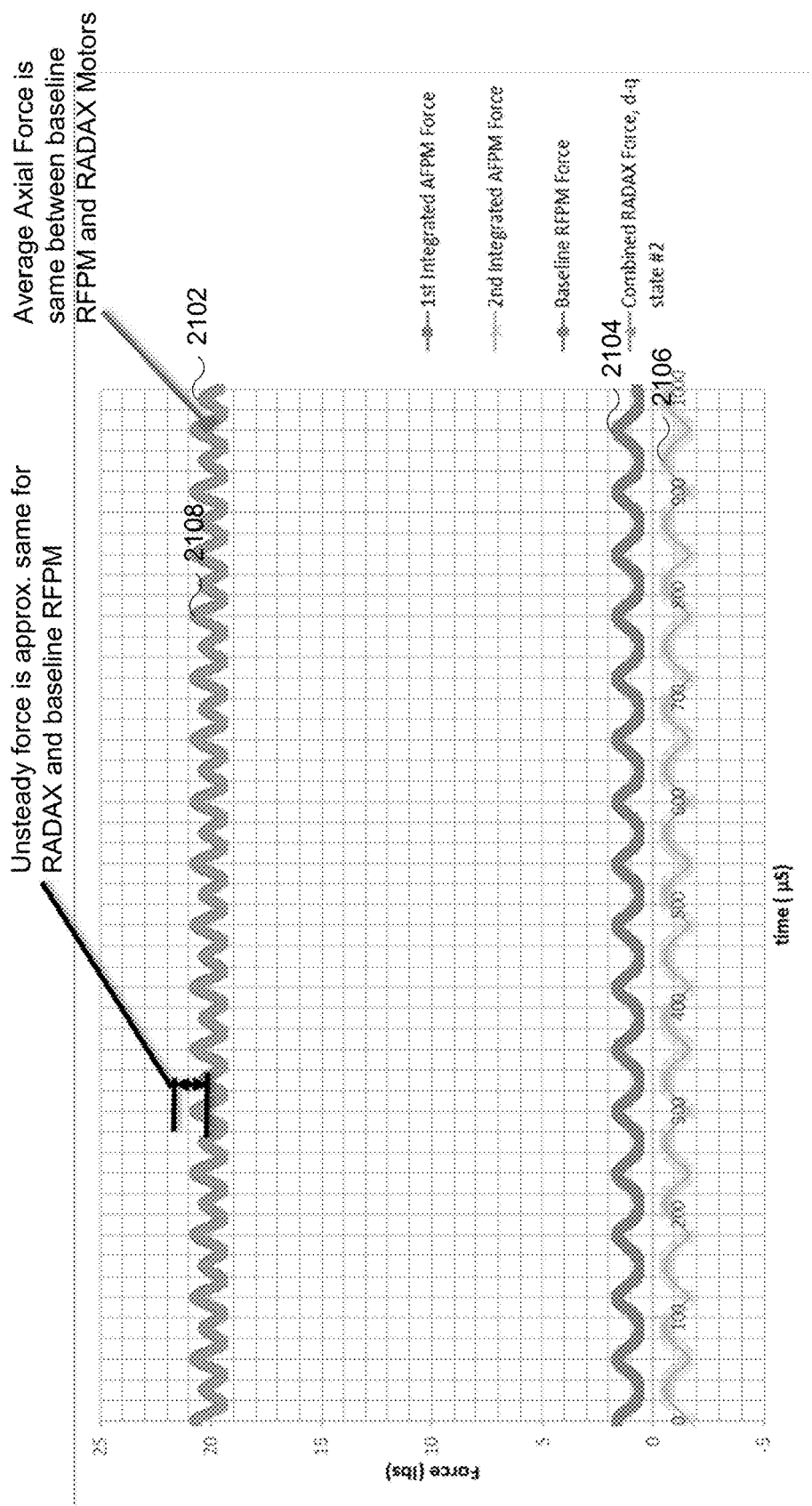
FIG. 21 illustrates a Force plot over time for a first state for a Radial-Axial propulsion motor according to an embodiment of the present invention.

FIG. 21 illustrates a Force plot over time for a second state for a Radial-Axial propulsion motor including a radial flux induction motor for the primary motor and two axial flux permanent magnet motors for the secondary motors. FIG. 21 illustrates baseline radial flux torque plot 2102 versus time for the radial flux induction propulsion motor. A first axial flux torque 2104 from a first axial flux propulsion motor can be combined with a second axial flux torque 2106 from a second axial flux propulsion motor. In a second d-q state for the first and second axial flux propulsion motors, the first axial flux torque 2104 and second axial flux torque 2106 appear to be 180 degrees out of phase. The radial flux torque 2102 also appears to be in phase with the first axial flux torque 2104 but 180 degrees out of phase with second axial flux torque 2106. As shown in FIG. 21, the axial flux propulsion motors can combine with the radial flux torque 2102 to produce an integrated torque 2108. The additional torque from the first axial flux torque 2104 can be offset by the second axial flux torque 2106. Therefore, the integrated torque 2108 is not much different from the radial flux torque 2104.

Figure 22:
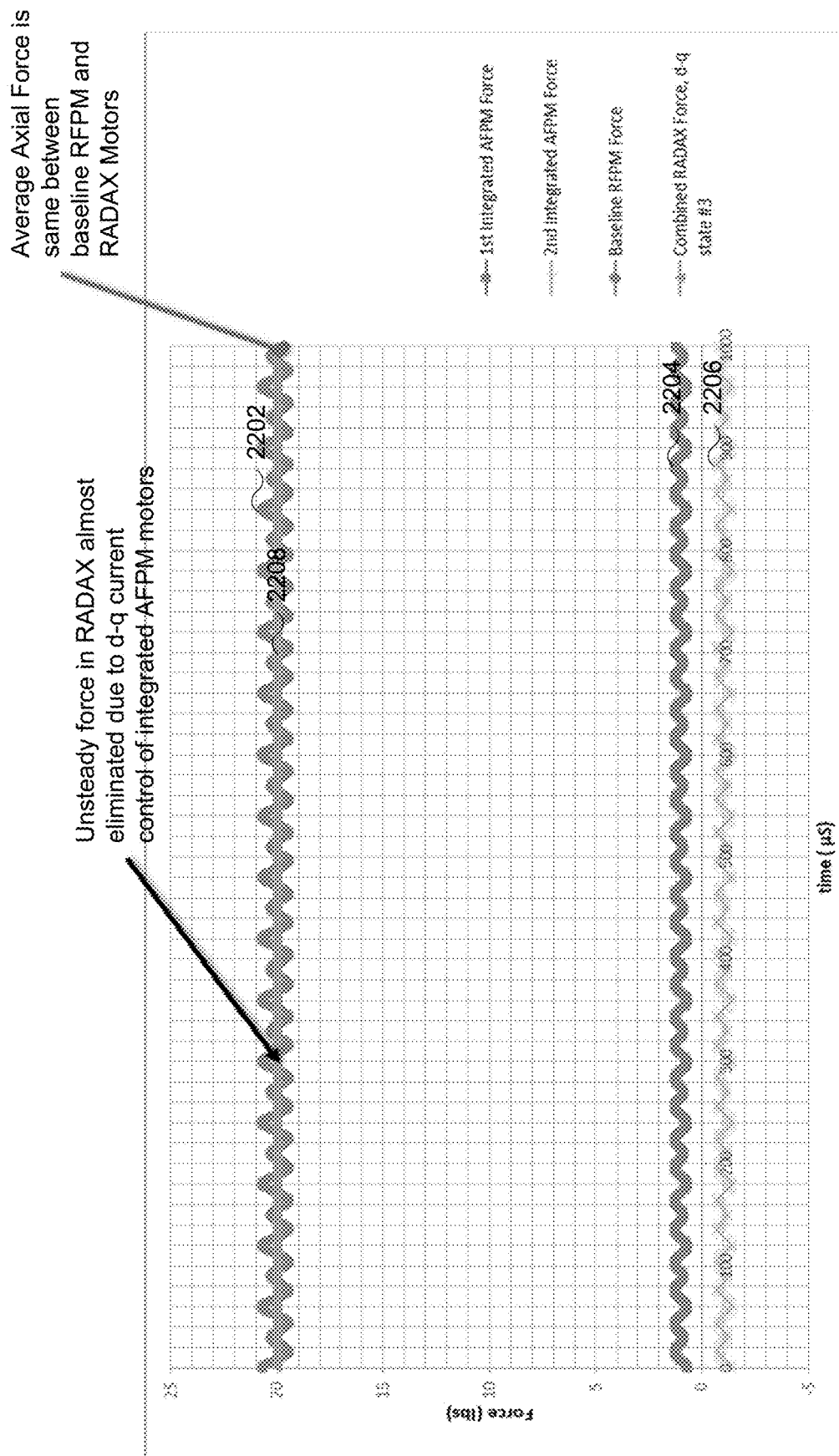
FIG. 22 illustrates a Force plot over time for a first state for a Radial-Axial propulsion motor according to an embodiment of the present invention.

FIG. 22 illustrates a Force plot over time for a third state for a Radial-Axial propulsion motor including a radial flux induction motor for the primary motor and two axial flux permanent magnet motors for the secondary motors. FIG. 22 illustrates baseline radial flux torque plot 2202 versus time for the radial flux induction propulsion motor. A first axial flux torque 2204 from a first axial flux propulsion motor can be combined with a second axial flux torque 2206 from a second axial flux propulsion motor. In a third d-q state for the first and second axial flux propulsion motors, the first axial flux torque 2204 and second axial flux torque 2206 appear to be approximately in phase. The first axial flux torque 2204 appears to produce a positive contribution and the second axial flux torque 2206 appears to produce a negative contribution. The radial flux torque 2202 also appears to be 180 degrees out of phase with the first axial flux torque 2204 and the second axial flux torque 2206. As shown in FIG. 22, the axial flux propulsion motors can combine with the radial flux torque 2202 to produce an integrated torque 2208. The integrated torque 2208 can reduce or eliminate the unsteady force in the integrated torque 2208 due to d-q current control of the integrated axial flux propulsion motors. However, the force for the integrated torque 2208 is not much different from the average torque force of the radial flux torque 2202.

Figure 23:
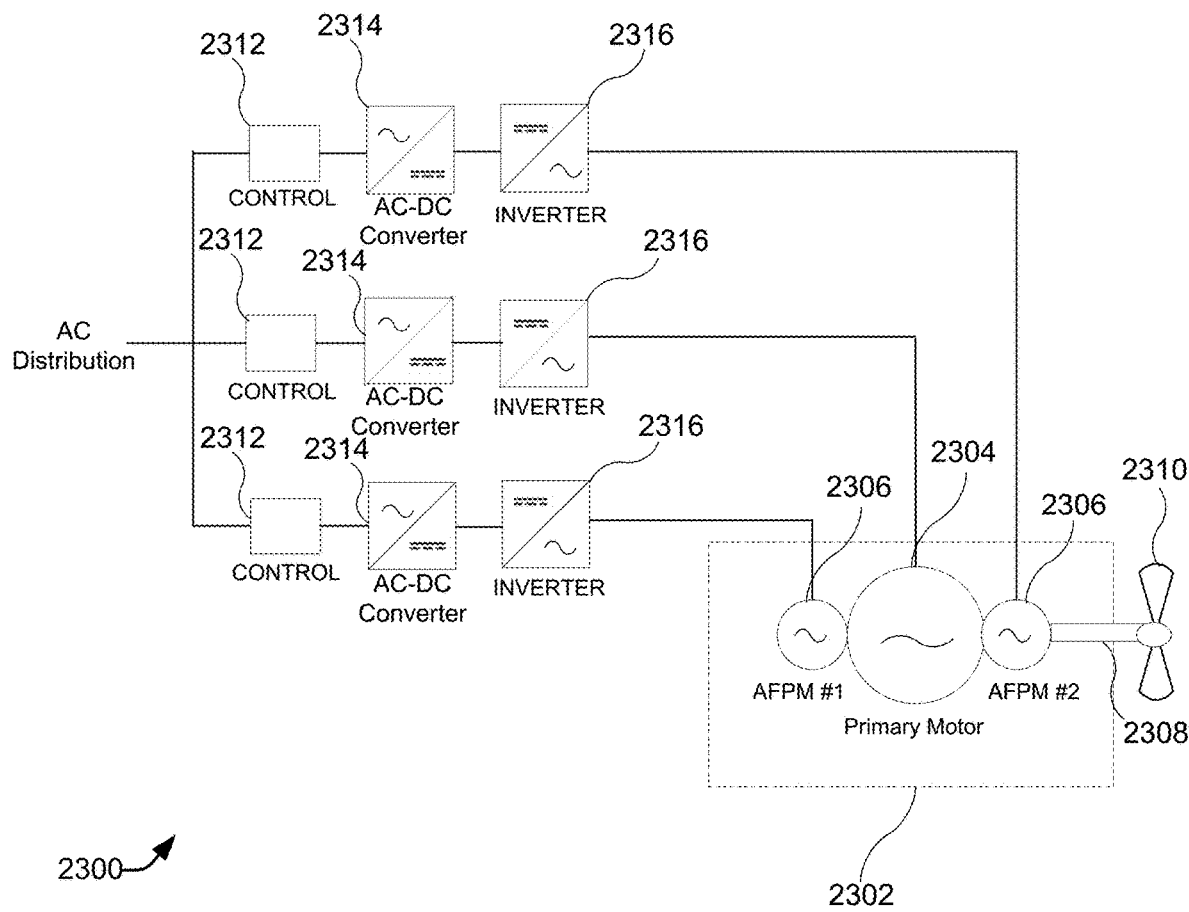
FIG. 23 illustrates a simplified electrical propulsion system for a vessel according to an embodiment of the present invention.

FIG. 23 illustrates a simplified electrical propulsion system 2300 for a vehicle, vessel, or aircraft. The electrical propulsion system 2300 can include a radial axial motor 2302. The radial axial motor 2302 can include any of the combinations of primary motors and secondary motors discussed herein. For example, FIG. 23 illustrates a primary motor 2304 and two secondary axial flux propulsion motors 2306. The primary motor 2304 and the secondary motors 2306 can drive a common shaft 2308. In some embodiments, the common shaft 2308 can turn a propeller 2310. The electrical propulsion system 2300 can receive alternating current from a main distribution system. A controller 2312 can vary the amount and d-q state of the current that is applied to the motors. An AC/DC converter 2314 or an inventor 2316 can be used to change the current from alternating current to direct current or direct current to alternating current respectively.

Figure 24:
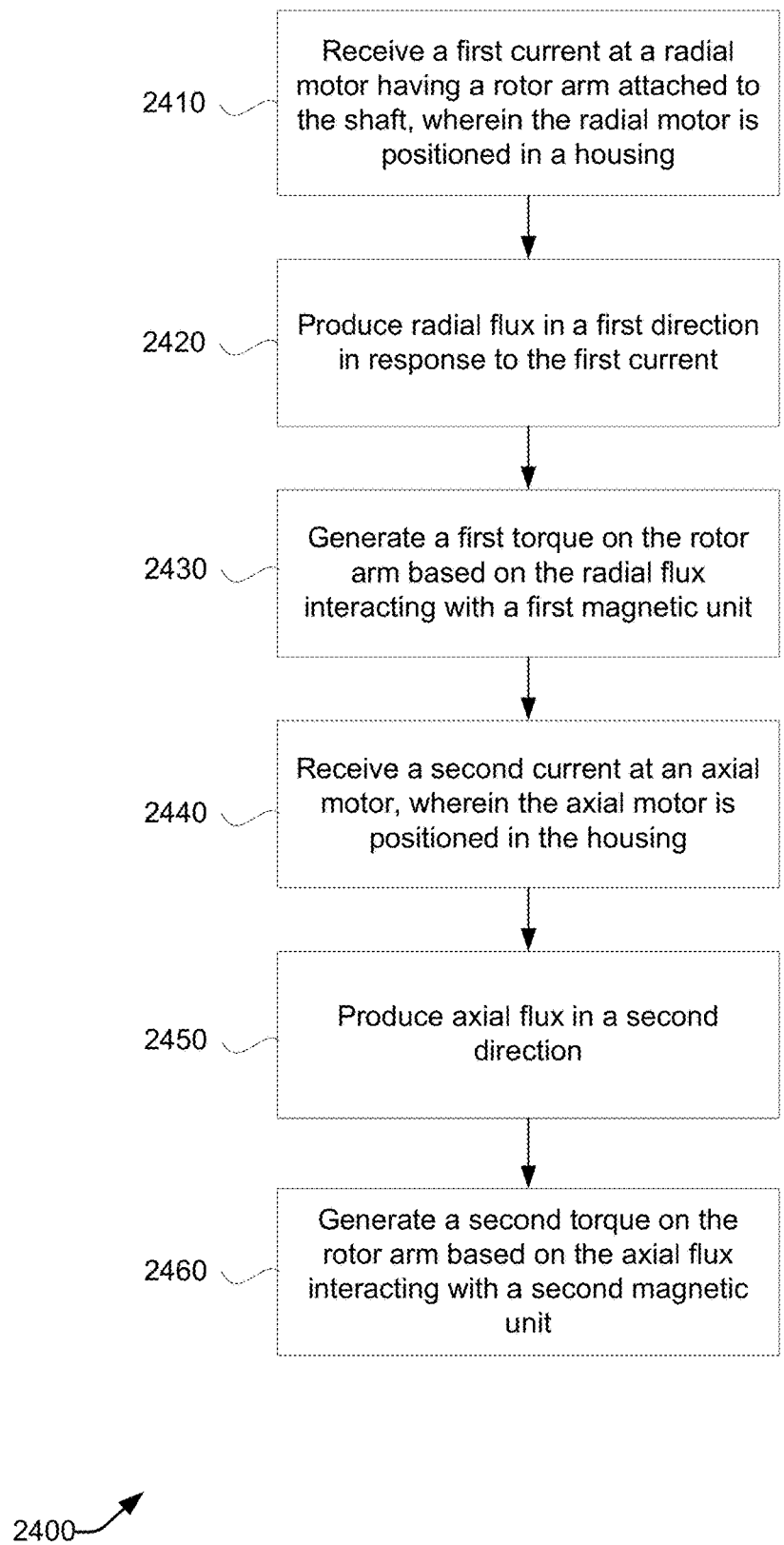
FIG. 24 is a flow chart of an example process for generating torque with a hybrid Radial-Axial motor according to an embodiment of the present invention.

FIG. 24 is a flow chart of an example process 2400 for generating torque on a shaft for a propulsion system (e.g., a hybrid Radial-Axial motor). In some implementations, one or more process blocks of FIG. 24 can be performed by an electric machine. In some implementations, one or more process blocks of FIG. 24 can be performed by another device or a group of devices separate from or including the electric machine.

The method includes receiving a first current at a radial motor having a rotor arm attached to the shaft (2410). As an example, the first current comprises a first set of d-axis and q-axis currents applied to the radial motor. The radial motor is positioned in a housing. The first current can be alternating current that the passes through a primary rotor stator. The first current can be independently controlled using a controller. The amplitude, cycles, phase, frequency, peak-to-peak voltage and root mean square of voltage of the second current can be controlled.

The method includes producing radial flux in a first direction in response to the first current (2420). As alternating current passes through a coil of the radial motor it can generate a magnetic field or flux. The radial flux runs radially with respect to the direction of the rotor shaft.

The method also includes generating a first torque on the rotor arm based on the radial flux interacting with a first magnetic unit (2430). The first magnetic unit can be a permanent magnet. The first magnetic unit can be an induction motor. In various embodiments, the rotor motor includes a radial arm. The radial arm can includes one or more permanent magnets on the face of the radial arm. The permanent magnet produces a magnetic field that reacts to the magnetic field of the radial stators. The reaction produces a torque on the rotor arm that in turn produces a torque on the common rotor shaft.

In various embodiments, the radial motor can include an induction motor. Similar to the rotary stators, the induction motor can generate a magnetic field by applying an alternating current to a series of coils of the induction motor rotor. The induction motor rotor can generate a magnetic field that reacts to the magnetic field of the radial stators. The reaction produces a torque on the rotor arm that in turn produces a torque on the common rotor shaft.

The method also includes receiving a second current at an axial motor (2440). As an example, the second current comprises a second set of d-axis and q-axis currents applied to the radial motor. The axial motor is positioned in a housing. The second current can be alternating current that the passes through a secondary motor stator. The second current can be independently controlled using a controller. The amplitude, cycles, phase, frequency, peak-to-peak voltage and root mean square of voltage of the second current can be controlled.

The method also includes producing axial flux in a second direction (2450). As alternating current passes through a coil of the axial motor it can generate a magnetic field or axial flux.

The method also includes generating a second torque on the rotor arm based on the axial flux interacting with a second magnetic unit (2460). The second magnetic unit can be a permanent magnet. The second magnetic unit can be an induction motor. In various embodiments, the secondary motor includes a rotor arm. The rotor arm can include one or more permanent magnets on the face of the axial rotor arm. The permanent magnet produces a magnetic field that reacts to the magnetic field of the axial stators. The reaction produces a torque on the axial rotor arm that in turn produces a torque on the common rotor shaft.

In various embodiments, the axial motor can include an induction motor. Similar to the rotary stators, the induction motor can generate a magnetic field by applying an alternating current to a series of coils of the induction motor rotor. The induction motor rotor can generate a magnetic field that reacts to the magnetic field of the axial stators. The reaction produces a torque on the axial rotor arm that in turn produces a torque on the common rotor shaft.

In some implementations, the radial motor and the axial motor are positioned in a housing to reduce cross magnetic flux from either the radial motor or the axial motor.

Process 2400 can include additional implementations, such as any single implementation or any combination of implementations described below and/or in connection with one or more other processes described elsewhere herein. It should be appreciated that the specific steps illustrated in FIG. 24 provide particular techniques for a hybrid Radial-Axial motor according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 24 can include multiple sub-steps that can be performed in various sequences as appropriate to the individual step. Furthermore, additional steps can be added or removed depending on the particular applications. One of ordinary skill in the art would recognize many variations, modifications, and alternatives.

In various embodiments, the first torque is characterized by a first oscillation amplitude; the second torque is characterized by a second oscillation amplitude; and a sum of the first torque and the second torque is characterized by an integrated oscillation amplitude less than both the first oscillation amplitude and the second oscillation amplitude.

In various embodiments, the method further includes operating the propulsion system in a boost mode by: setting the first current at a first maximum value; and setting the second current at a second maximum value.

In various embodiments, the method further includes operating the propulsion system in a coast mode by selectively reduce or de-energize the first or the second current, or a combination thereof.

In some implementations, process 2400 can include receiving a third current at a transverse-flux motor producing transverse flux in a third direction, the transverse flux influences a third magnetic unit to generate a third torque on the rotor arm attached to the shaft.

Although FIG. 24 shows example steps of process 2400, in some implementations, process 2400 can include additional steps, fewer steps, different steps, or differently arranged steps than those depicted in FIG. 24. Additionally, or alternatively, two or more of the steps of process 2400 can be performed in parallel.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered.

What is claimed is:

1. An electric machine comprising:
   a housing;
   a radial motor located inside the housing, the radial motor configured to produce radial flux in a first direction, wherein the radial flux influences a first magnetic unit to produce a first torque on a rotor arm attached to a common motor shaft;
   an axial motor located on a first side of the radial motor inside the housing and inside the radial motor, wherein the axial motor is configured to produce axial flux in a second direction, wherein the axial flux influences a second magnetic unit to produce a second torque on the rotor arm attached to the common motor shaft;
   a gear set located on a second, opposing side of the radial motor inside the housing, wherein the gear set is affixed to both the common motor shaft and an output shaft aligned with the common motor shaft;
   a propeller affixed to the output shaft; and
   a controller or load configured to independently control the first torque and the second torque.

2. The electric machine of claim 1, wherein the controller controls d-axis current and q-axis current applied to at least one of the radial motor, the axial motor, or a combination thereof to reduce torque oscillation on the common motor shaft.

3. The electric machine of claim 1, wherein the radial motor comprises an induction motor.

4. The electric machine of claim 1, wherein the radial motor comprises a wound-field synchronous motor.

5. The electric machine of claim 1, wherein the radial motor comprises a DC motor.

6. The electric machine of claim 1, wherein the radial motor comprises a universal motor.

7. The electric machine of claim 1, wherein the radial motor comprises a reluctance motor.

8. The electric machine of claim 1, wherein the axial motor comprises an induction motor.

9. The electric machine of claim 1, further comprising a transverse-flux motor within the housing, the transverse-flux motor produces transverse flux in a third direction, the transverse flux influences a third magnetic unit to generate a third torque on the rotor arm attached to the common motor shaft.

10. A propulsion system, comprising:
    a housing;
    a radial motor located in the housing, the radial motor configured to produce radial flux in a first direction, wherein the radial flux influences a first magnetic unit to produce a first torque on a rotor arm attached to a common motor shaft;
    an axial motor located on a first side of the radial motor in the housing and inside the radial motor, wherein the axial motor is configured to produce axial flux in a second direction, wherein the axial flux influences a second magnetic unit to produce a second torque on the rotor arm attached to the common motor shaft; and
    a gear set located on a second, opposing side of the radial motor inside the housing, wherein the gear set is affixed to both the common motor shaft and an output shaft aligned with the common motor shaft;
    a propeller affixed to the output shaft; and
    a controller configured to independently control the first torque and the second torque.

11. The propulsion system of claim 10, wherein the controller controls d-axis current and q-axis current applied to at least one of the radial motor, the axial motor, or a combination thereof to reduce or amplify torque oscillation on the common motor shaft.

12. The propulsion system of claim 10, wherein the radial motor comprises an induction motor.

13. The propulsion system of claim 10, wherein the axial motor comprises an induction motor.

14. The propulsion system of claim 10, further comprising a transverse-flux motor within the housing, the transverse-flux motor produces transverse flux in a third direction, the transverse flux influences a third magnetic unit to generate a third torque on the rotor arm attached to the common motor shaft.

15. The electric machine of claim 1 wherein the housing is mounted in a vehicle, vessel, or aircraft.

16. The electric machine of claim 1 wherein the output shaft is affixed to the gear set inside the housing.

17. The propulsion system of claim 10 wherein the housing is mounted in a vehicle, vessel, or aircraft.

18. The propulsion system of claim 10 wherein the output shaft is affixed to the gear set inside the housing.

* * * * *